(12) United States Patent
Larson

(10) Patent No.: US 11,290,367 B2
(45) Date of Patent: *Mar. 29, 2022

(54) HIERARCHICAL NETWORK CONFIGURATION

(71) Applicant: CIENA CORPORATION, Hanover, MD (US)

(72) Inventor: Michael David Larson, San Francisco, CA (US)

(73) Assignee: CIENA CORPORATION, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/099,241

(22) Filed: Nov. 16, 2020

(65) Prior Publication Data

US 2021/0075713 A1 Mar. 11, 2021

Related U.S. Application Data

(63) Continuation of application No. 16/733,124, filed on Jan. 2, 2020, now Pat. No. 10,873,523, which is a
(Continued)

(51) Int. Cl.
*H04L 29/08* (2006.01)
*H04L 45/02* (2022.01)
*H04L 45/64* (2022.01)

(52) U.S. Cl.
CPC ............. *H04L 45/02* (2013.01); *H04L 45/64* (2013.01)

(58) Field of Classification Search
CPC ...................................................... H04L 45/02
See application file for complete search history.

(56) References Cited

U.S. PATENT DOCUMENTS 7,917,624 B2 * 3/2011 Gidwani ............... H04W 84/00
   709/226
9,276,959 B2 * 3/2016 Theimer ................. H04L 63/20
(Continued)

OTHER PUBLICATIONS

"Non-Final Office Action for U.S. Appl. No. 14/679,328", dated Sep. 13, 2017, 10 pages.
(Continued)

*Primary Examiner* — Adnan M Mirza
(74) *Attorney, Agent, or Firm* — Guntin & Gust, PLC; Jay Anderson

(57) ABSTRACT

Systems, methods, apparatus and computer-readable medium are described for improving efficiency and robustness for configuring data-planes. Furthermore, systems, methods, and devices are provided for efficiently storing, maintaining and retrieving configuration information for data-planes. The configuration information may be stored and retrieved from a hierarchy of information stored in memory, such as a hierarchy of information in memory, wherein the hierarchy of information has configuration data for one or more data-planes and represents one or more command sequences issued by a controller of the control-plane to one or more data-planes. In certain implementations, the hierarchy of information comprises a plurality of nodes, wherein each node represents at least a portion of a command sequence issued by the controller. The command sequences may be configuration command sequences issued by the control plane to configure the data-planes.

20 Claims, 16 Drawing Sheets

Related U.S. Application Data continuation of application No. 16/054,988, filed on Aug. 3, 2018, now Pat. No. 10,536,365, which is a continuation of application No. 14/679,328, filed on Apr. 6, 2015, now Pat. No. 10,057,156.

(60) Provisional application No. 62/035,319, filed on Aug. 8, 2014.

(56) References Cited

U.S. PATENT DOCUMENTS

| | | |
|---|---|---|
| 9,519,674 B2 | 12/2016 | Vermeulen et al. |
| 10,057,156 B2 | 8/2018 | Larson |
| 2016/0043927 A1 | 2/2016 | Larson |
| 2018/0343187 A1 | 11/2018 | Larson |

OTHER PUBLICATIONS

"Non-Final Office Action for U.S. Appl. No. 14/679,328", dated Apr. 11, 2017, 9 pages.
"Notice of Allowance for U.S. Appl. No. 14/679,328", dated Apr. 20, 2018, 5 pages.
"Notice of Allowance for U.S. Appl. No. 16/054,988", dated Sep. 5, 2019, 8 pages.

* cited by examiner

| | | |
|---|---|---|
| 208 | DATA-PLANE 4<br>INTERFACE 1<br><br>} | {         CONFIGURATION DATA 1<br>{<br>security/firewall/foobar/rule/100  Value<br>security/firewall/foobar/rule/102  Value<br>security/firewall/barbax/rule/302  Value<br>}    ~902 |
| | DATA-PLANE 3 | CONFIGURATION DATA 2 |
| | DATA-PLANE 2 | CONFIGURATION DATA 3 |
| | DATA-PLANE 1 | CONFIGURATION DATA 4 |
| | DATA-PLANE 6 | CONFIGURATION DATA 5 |
| | DATA-PLANE 5 | CONFIGURATION DATA 6 |
| | ⋮ | ⋮ |

FIG. 9

| Configuration Node Structure | |
|---|---|
| Table | Hash |
| Char | Value |
| Char | Topic |
| Char | Interface |
| Unsigned Integer | Sequence |

FIG. 12A

```
typedef struct {
    lh_table *_hash;
    char *_value;
    char *_topic;
    char *_interface;
    uint64_t _seq;

} config_node_t;
```

FIG. 12B

HIERARCHICAL NETWORK CONFIGURATION

CROSS-REFERENCES TO RELATED APPLICATIONS

The present application is a continuation of U.S. application Ser. No. 16/733,124, filed Jan. 2, 2020, which is a continuation of U.S. application Ser. No. 16/054,988, filed Aug. 3, 2018, now U.S. Pat. No. 10,536,365, which is a continuation of U.S. application Ser. No. 14/679,328, filed Apr. 6, 2015, now U.S. Pat. No. 10,057,156, which claims the benefit and priority under 35 U.S.C. 119(e) of U.S. Provisional Application No. 62/035,319, filed Aug. 8, 2014, the entire contents of which are incorporated herein by reference for all purposes.

BACKGROUND

The present disclosures generally relate to network devices and systems, and more specifically, improving efficiency and robustness for configuring data-planes.

Traditionally, network devices may have a control-plane and a finite number of data-planes all with in the same physical network device. In certain instances, the data-planes are capable of forwarding the packets arriving on an inbound interface. For example, the data-plane may look up the destination address of the incoming packet and retrieve the information necessary to determine the path from the receiving element through the fabric for the network device. In such a hardware configuration, the configuration information associated with each data-plane is readily known by the controller associated with the control-plane or can be ascertained by the controller. In the event that a data-plane needs to be rebooted and reconfigured, the whole system is rebooted and reconfigured as part of bringing the system back up.

In more recent network devices and systems, the static relationship between the control-plane and the data-plane may no longer exist. For example, in a distributed network system, the relationship between the control-plane and the data-plane may be more dynamic. For instance, the number of data-planes associated with a distributed network system may change over time. Furthermore, the data-planes may be dispersed both logically and physically, in some instances. Therefore, the static techniques of maintaining and updating data-planes as performed in traditional network devices may not be adequate.

SUMMARY

The present disclosures generally relate to network devices and systems, and more specifically, improving efficiency and robustness for configuring data-planes.

Systems, methods, apparatus and computer-readable medium are described for improving efficiency and robustness for configuring data-planes. Furthermore, systems, methods, and devices are provided for efficiently storing, maintaining and retrieving configuration information for data-planes. The configuration information may be stored and retrieved using a hierarchy of information stored in memory, wherein the hierarchy of information stores configuration data for one or more data-planes and represents one or more configuration command sequences issued by a controller of the control-plane to one or more data-planes, and the hierarchy of information comprises a plurality of nodes, wherein each node represents at least a portion of a configuration command sequence issued by the controller. The hierarchy of information may be stored as one or more data structures. According to certain aspects of the disclosure, an example device may include one or more processing entities and a memory associated with the one or more processing entities for storing a hierarchy of information, wherein the hierarchy of information stores configuration data for one or more data-planes and represents one or more command sequences issued by one or more controllers associated with a control-plane to the one or more data-planes, and wherein the hierarchy of information comprises a plurality of nodes, wherein each node represents at least a portion of the command sequence issued by the controller. The command sequence may be a configuration command sequence for configuring one or more data-planes.

According to certain aspects of the disclosure, an example device may include a memory and one or more processing entities configurable to receive a request to update configuration information associated with a data-plane, determine an interface associated with the data-plane from the request, traverse a hierarchy of information to identify each of the nodes comprising configuration information associated with the interface, wherein the hierarchy of information stores configuration data for the interface associated with the data-plane, and transmit the configuration information to the data-plane.

According to certain aspects of the disclosure, an example device may include a memory and one or more processing entities configurable to receive a configuration command sequence associated with configuring one or more end points, the command sequence comprising multiple portions, traverse the command sequence from left to right, wherein for each portion of the command sequence traverse one or more nodes of a hierarchy of information, wherein each node represents at least a portion of one or more command sequences previously received by the device. If the portion of the command sequence is found, continue traversing down the nodes to find a node that matches the next portion of the command sequence, and if the portion of the command sequence is not found, create a new node for the portion of the command sequence.

According to certain aspects of the disclosure, an example device may include a memory configurable for storing configuration information for one or more data-planes as a hierarchy of information. The example device may further include one or more processing entities coupled to the memory and configurable to track one or more command sequences issued by one or more controllers associated with a control-plane to the one or more data-planes, and store, in the memory, portions of the one or more command sequences as part of the hierarchy of information, the hierarchy of information comprising a plurality of nodes, wherein each node comprises information indicative of at least a portion from the portions of the one or more command sequences issued by the controller.

According to certain aspects of the disclosure, the example device may include a memory storing configuration information as a hierarchy of information, the configuration information indicative of a set of command sequences received by the device issued by one or more controllers associated with a control-plane to the one or more data-planes. The example device may further include one or more processing entities configurable to receive a request for configuration information associated with a data-plane from the one or more data-planes, determine an interface associated with the data-plane from the request, identify the configuration information associated with the interface for the data-plane, and transmit the configuration information to the data-plane.

According to certain aspects of the disclosure, the example device may include a memory storing configuration information, the configuration information storing information indicative of a set of command sequences received by the device. The example device may also include one or more processing entities configurable to receive a first command sequence for configuring one or more devices, determine, based upon the first command, an ordered sequence of portions, wherein each portion in the ordered sequence of portions corresponds to a portion of the first command and the ordering of a portion in the ordered sequence of portions depends upon a position of the portion within the first command, determine if the configuration information stores information indicative of the first command by comparing, in order, each portion in the ordered sequence of portions with information included in the configuration information, upon determining, based upon the comparing, that the configuration information does not store information corresponding to a particular portion from the ordered sequence of portions, adding information to the configuration information corresponding to the particular portion.

BRIEF DESCRIPTION OF THE DRAWINGS

FIG. 9 is an example representation of an example configuration cache.

FIG. 12A represents an example implementation of a node residing in the hierarchy of information.

FIG. 12B represents an example syntactical representation of the node represented in FIG. 12A.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Traditionally, network devices may have a control-plane and a finite number of data-planes all within the same physical network device. In certain instances, the data-planes are capable of forwarding the packets arriving on an inbound interface. For example, the data-plane may look up the destination address of the incoming packet and retrieve the information necessary to determine the path from the receiving element, through the fabric for the network device. In such a hardware configuration, the configuration information associated with each data-plane is readily known by the controller associated with the control-plane or can be ascertained by the controller. In the event that a data-plane needs to be rebooted and reconfigured, the whole system is rebooted and reconfigured as part of bringing the system back up.

In more recent network devices and systems, the static relationship between the control-plane and the data-plane may no longer exist. For example, in a distributed network system, the relationship between the control-plane and the data-plane may be more dynamic. For instance, the number of data-planes associated with a distributed network system may change overtime. Furthermore, the data-planes may be dispersed both logically and physically, in some instances. Therefore, the static techniques of maintaining and updating data-planes as performed in traditional network devices may not be adequate.

Figure 1:
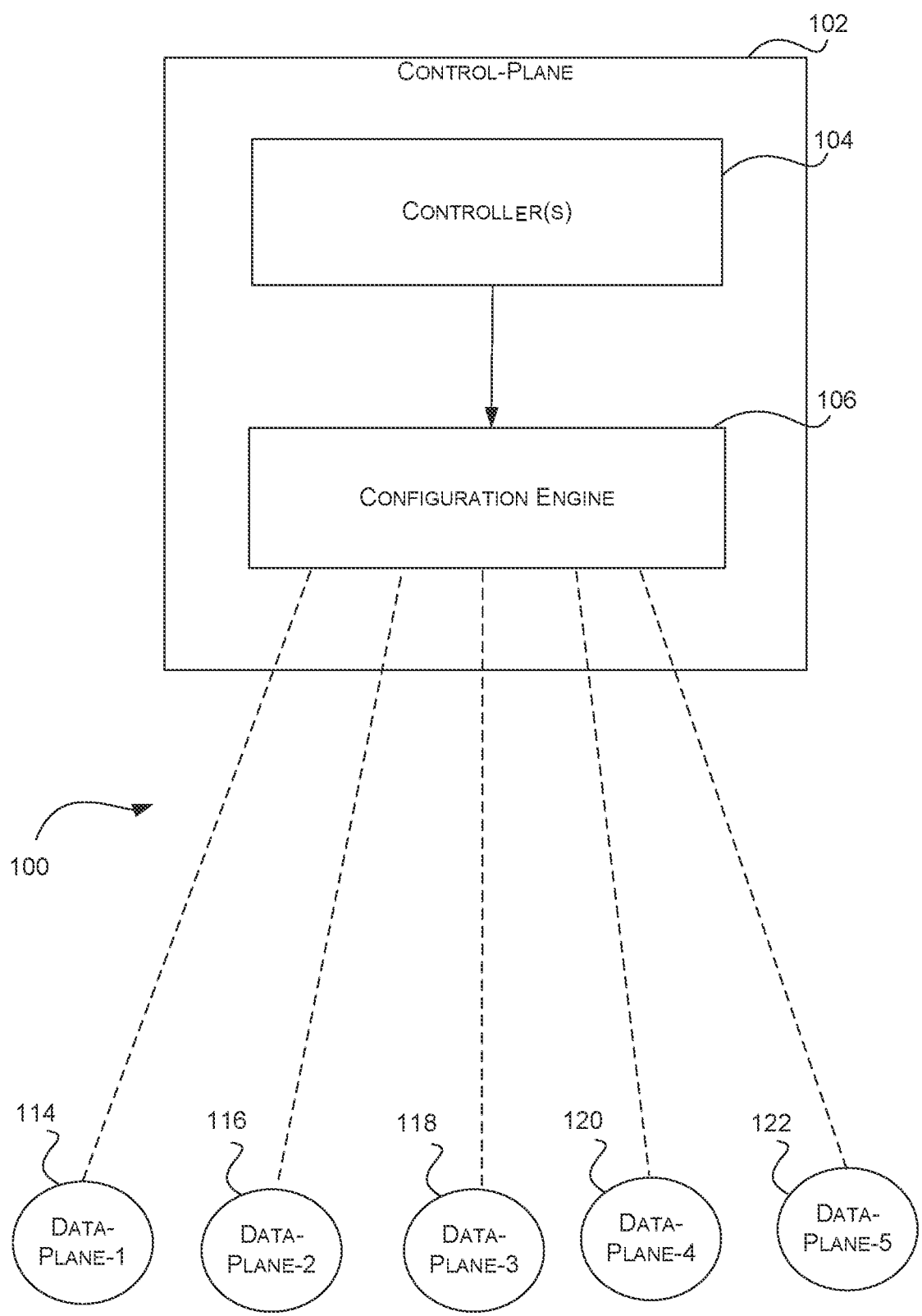
FIG. 1 is an example block diagram for illustrating certain aspects of an example distributed network system, according to certain aspects of the disclosure.

FIG. 1 is an example block diagram for illustrating certain aspects of an example distributed network system 100, according to certain aspects of the disclosure.

The distributed network system 100, shown in FIG. 1, may have a control-plane 102 and one or more data-planes (114, 116, 118, 120 and 122), with a network fabric connecting the control-plane and the data-planes. The control-plane and/or the data-planes may be implemented using one or more computing devices or components of the computing devices described with respect to FIG. 15 or network device of FIG. 16. In certain embodiments, the distributed network system 100 may be implemented using one or more SDN (software defined networking) principles. In certain instances, network fiber may refer to a network topology for interconnecting several components for routing packets.

The control-plane 102 may be responsible for system configuration, management and exchange of routing table information. The control-plane 102 may perform these tasks by generating and processing control-plane packets either destined to or originated by the components of the distributed network system 100, such as the data-planes. For example, the control-plane 102 may exchange topology information with other network devices or systems and construct/maintain the routing table using routing protocols such as routing information protocol (RIP), open shortest path first (OSPF) or border gateway protocol (BGP). In some instances, the control-plane 102 may be referred to as the management plane.

The control-plane 102 may include one or more controllers 104 for performing some of the functions described above. The one or more controllers 104 may be one or more processing entities. The processing entity may be a physical processor, such as an Intel®, AMD®, or TI® processor, or an application specific integrated circuit (ASIC). In another embodiment, a processing entity may be a group of processors. In another embodiment, a processing entity may be a processor core of a multicore processor. In yet another embodiment, a processing entity may be a group of cores from one or more processors. A processing entity can be any combination of a processor, a group of processors, a core of a processor, or a group of cores of one or more processors.

In certain embodiments, the processing entity may be a virtual processing unit or a software partitioning unit such as a virtual machine, hypervisor, software process or an application running on a processing unit, such as a physical processing unit, core or logical processor. For example, the two or more processing entities may be virtual machines executing or scheduled for execution on one or more physical processing units, one or more cores executing within the same physical processing unit or different physical processing units, or one or more logical processors executing on one or more cores on the same physical processing unit or separate physical processing units.

The data-planes may be responsible for forwarding packets to the next hop in the network based on the routing and configuration information received from the control-plane 102. In certain implementations, a data-plane may support layer 2 and layer 3 routing functionality associated with a routing entity, stateful and stateless firewalls, application flows, application logic gateways, Network Access Device (NAD) capability, and in some instances, partial or full implementations of layer 4 routing and higher level inspection capability. In some instances, a data-plane may also be referred as a forwarding plane. The data-planes may be implemented using one or more processing entities as described above for processing packets received from the network through one or more interfaces or the control-plane with respect to the control-plane 102. Each data-plane may have one or more physical (e.g., network interface card, NIC) or virtual interfaces (e.g., local loopback). In certain implementations, the interface may be addressable by a port number. In certain embodiments, an interface may be associated with ingress/egress of packets from the data-plane. In certain embodiments, the interface may be represented as a unique identifier at the control-plane interface. Although, data-planes are discussed throughout the application, other devices or endpoints may be used without deviating from the scope of the invention.

Any combination of physical and virtual processing entities and devices may be used in configuring the control-plane 102 and the data-planes. For example, any of the control-planes and data-planes may be either physical entities or virtual entities operating on a single system or multiple systems to provide their respective functionality, without deviating from the scope of the invention.

In such a distributed network system 100, when a data-plane leaves and reconnects to the network fabric, the control-plane 102 may be tasked with updating the configuration of the data-plane so that the data-plane can synchronize to the network fabric and continue processing and forwarding packets. In such a distributed network system 100, the data-planes may be physical devices or virtual machines with data-plane capabilities. In a distributed system, the number of data-planes and their configuration may be dynamic Maintaining and updating the data-planes as new data-planes join and previous data-planes rejoin may be challenging due to the distributed and unstructured networking environment. The data-planes may leave due to load-balancing, power outages, software updates, device failures or any other suitable reasons. In some instances, in an SDN environment data-planes may be expected to be highly dynamic, meaning that data-planes may frequently be moved, and/or re-provisioned within a virtual environment.

Aspects described herein enable efficient and robust reconfiguration of the data-planes for forwarding packets for a distributed network system 100 when the data-planes rejoin the network fabric of the distributed network system 100. In certain aspects of the disclosure, the configuration engine 106 may store configuration information associated with each of the data-planes and replay the configuration information for data-planes leaving and rejoining the network fabric of the distributed network system 100. The configuration engine 106 may also be responsible for interfacing with the data-planes, receiving requests for re-configuring the data-planes or interfaces associated with those data-planes, and maintaining the configuration information.

In certain embodiments, the one or more controllers 104 communicate with the data-planes through a configuration engine 106. In certain other embodiments, the one or more controllers 104 of the control plane 102 communicate with the data-planes through the configuration engine 106 for command sequences or replay requests from the data-planes. A command sequence may be a configuration command sequence from the one or more controllers to the one or more data-planes.

In some implementations, the configuration engine 106 is implemented as hardware, software or some combination of logic within the same device as the one or more controllers 104. In other implementations, the configuration engine 106 may be a virtual device, a virtual processing entity or a physical processing entity on the same or different device brokering communication between the one or more controllers 106 associated with the control-plane 102 and the data-planes.

In certain embodiments, the configuration engine 106 interface may represent the control-plane 102 interface to the data-planes. For example, the configuration engine 106 may act as the broker or interface between the controller 104 and the one or more data-planes. The configuration engine 106 and the data-planes may communicate with each other using a Dynamic Host Configuration Protocol (DHCP) or DHCP-like protocols or any other suitable protocol, without deviating from the scope of the invention.

As described herein, the configuration engine 106 reduces the load on the one or more controllers 104 for providing configuration services by storing and accessing the configuration representation for the data-planes in a robust and efficient manner.

Figure 2:
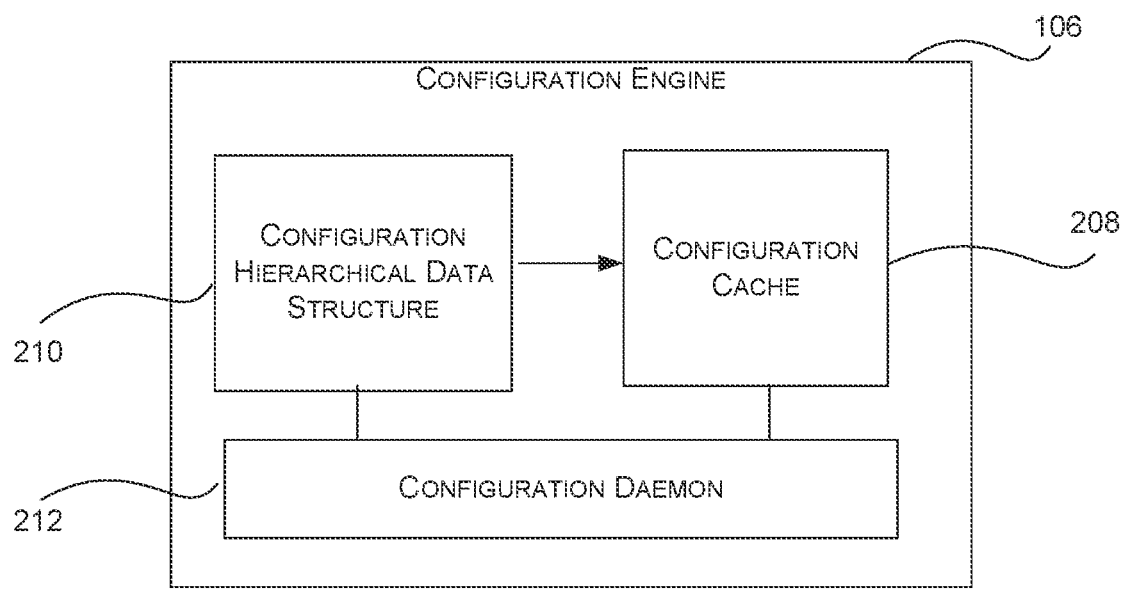
FIG. 2 is an example block diagram for a configuration engine, according to certain aspects of the disclosure.

FIG. 2 illustrates an example implementation of the configuration engine 106 from FIG. 1. In certain embodiments, the configuration engine 106 may comprise a hierarchy of information 210, a configuration (or information) cache 208 and a configuration daemon 212. The hierarchy of information 210 may be stored in memory as one or more hierarchical data structures.

In one implementation, the hierarchy of information 210 may store active configuration information for each data-plane and the interfaces associated with those data-planes. Storing active configuration information may refer to updating the configuration data stored for any the data-plane, such that the configuration information for each of the data-planes is current. For example, if a user or automated process issues a command sequence from the one or more controllers updating the state of the data-planes and the interfaces associated with the data-planes, the configuration engine 106 may also update the hierarchy of information 210, so that the information reflects the active configuration information.

In certain aspects, the active configuration information may be maintained not only for data-planes that are currently connected to the network fabric of the distributed network system 100, but also for data-planes that may have temporarily left the network fabric of the distributed network system 100. Maintaining active configuration information allows the data-planes that rejoin the network fabric of the distributed network system 100 to be reconfigured with the active configuration information and not stale configuration information from when those data-planes left the network fabric. In other words, the hierarchy of information, implemented as one or more configuration hierarchical data structures represents the state synchronization between the control-plane 102 and the data-planes, even when the data-planes may be temporarily unreachable.

In certain aspects, the hierarchy of information 210 stores configuration information such that the configuration information indicative of one or more command sequences issued by one or more controllers to one or more data-planes associated with the distributed network system 100. The command sequence may be a configuration command sequence for configuring the data-planes. The hierarchy of information 210 may be implemented as one or more command graph data structures or command tree data structures. A command graph may refer to a particular method of representing data using data structures or other techniques, such that the graph is a representation of the relation of the various portions of a command using links. A tree may be a representation of an undirected graph in which any two portions of the command are connected by exactly one path. Examples of using a hierarchical database for representing a command are described in more detail with reference to FIGS. 5-11.

In certain implementations, the interface data may be stored as meta-data for each node of the data structure. The nodes may include direct commands for specific data-planes with relevant interfaces. In certain aspects, the meta-data may be determined by the control-plane. If no meta-data is provided, the command sequence may be targeted for all interfaces. The control-plane may also provide meta-data that assigns command sequences or portions of the command sequences for all interfaces, one interface, or a group of interfaces. In certain implementations, a JavaScript Object Notation (JSON) may be used for implementing the data-structures for the hierarchy of information 210 storing the configuration information. Other notations, such as EXtensible Markup Language (XML) may be used for implementing the hierarchy of information 210 without deviating from the scope of the disclosure.

In addition to storing the configuration data for the data-planes in the hierarchy of information 210, the configuration data for certain data-planes or interfaces associated with the data-planes may be stored in a configuration cache 208 for quicker access. In certain implementations, the configuration cache 208 may store the most accessed configuration information or the configuration information for the most recently accessed configuration information, or some combination thereof.

The configuration daemon 212 may be responsible for interfacing with the data-planes, receiving requests for re-configuring the data-planes or interfaces associated with those data-planes, maintaining the hierarchy of information 210 and maintaining the configuration cache 208. In certain instances, the configuration daemon 212 may be implemented in software, firmware, hardware or any combination thereof. For example, in one implementation, the configuration daemon 212 may be implemented as instructions stored on a non-transient computer-readable medium and executed using one or more processing entities, as described with reference to the control-plane in FIG. 1. In some implementations, the configuration daemon 212 may be persistent over time and continue to operate while the one or more controllers 104 are powered.

The hierarchy of information 210 stores the active configuration information in forms of commands executed by the one or more controllers 104, such that the configuration for any given data-plane is readily retrievable. The configuration cache 208 further reduces the access time for retrieving active configuration information for a data-plane by caching the most recently used or most used configuration and the configuration daemon 212 manages the various different aspects of coordinating and fulfilling requests from the one or more controllers 104 and the data-planes. Therefore, as described herein, the configuration engine 106 reduces the load on the controllers 104 for providing configuration services by storing and accessing the configuration for the data-planes rejoining the network fabric in a robust and efficient manner.

Figure 3:
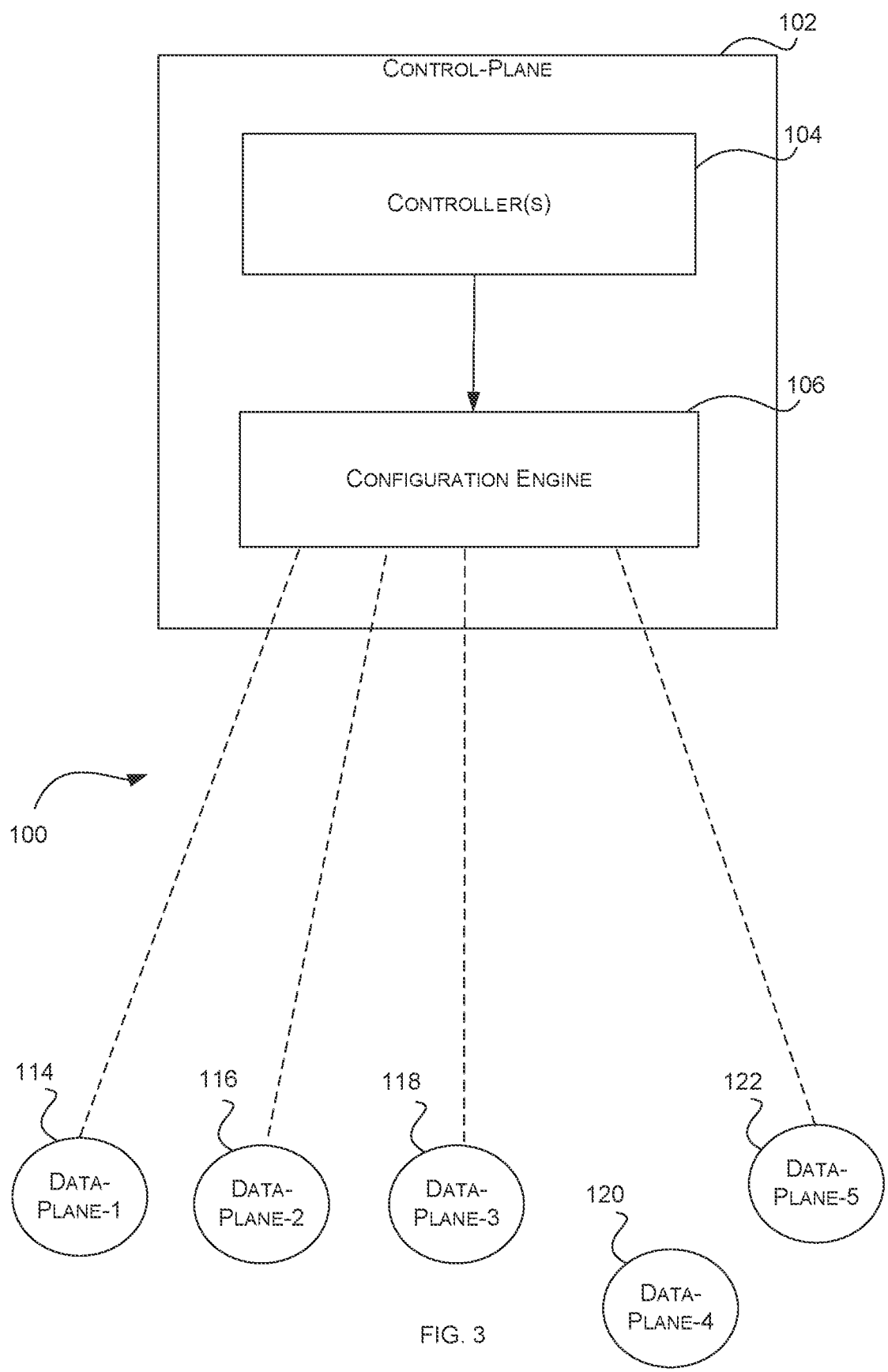
FIG. 3 is an example illustration of a data-plane disconnecting from the distributed network system.

FIG. 3 is an example illustration of a fourth data-plane 120 out of a plurality of data-planes disconnecting from the distributed network system 100. Disconnecting the data-plane 120 from the distributed network system 100 may include shutting down the resources associated with the data-plane 120 or re-allocating the resources associated with the fourth data-plane 120 temporarily to another task. Even after the data-plane disconnects, the hierarchy of information 210 and/or the configuration cache may maintain the configuration information associated with the fourth data-plane 120. In certain implementations, the configuration information regarding the fourth data-plane 120 may be evicted from the configuration cache 208 over time or based on other cache accesses policies. However, the configuration information for fourth data-plane 120 may continue to reside in the hierarchy of information 210. In certain implementations, the configuration information for the fourth data-plane 120 may be removed from the hierarchy of information 210 after a period of time, based on retention polices or explicit command sequences from the user.

Figure 4:
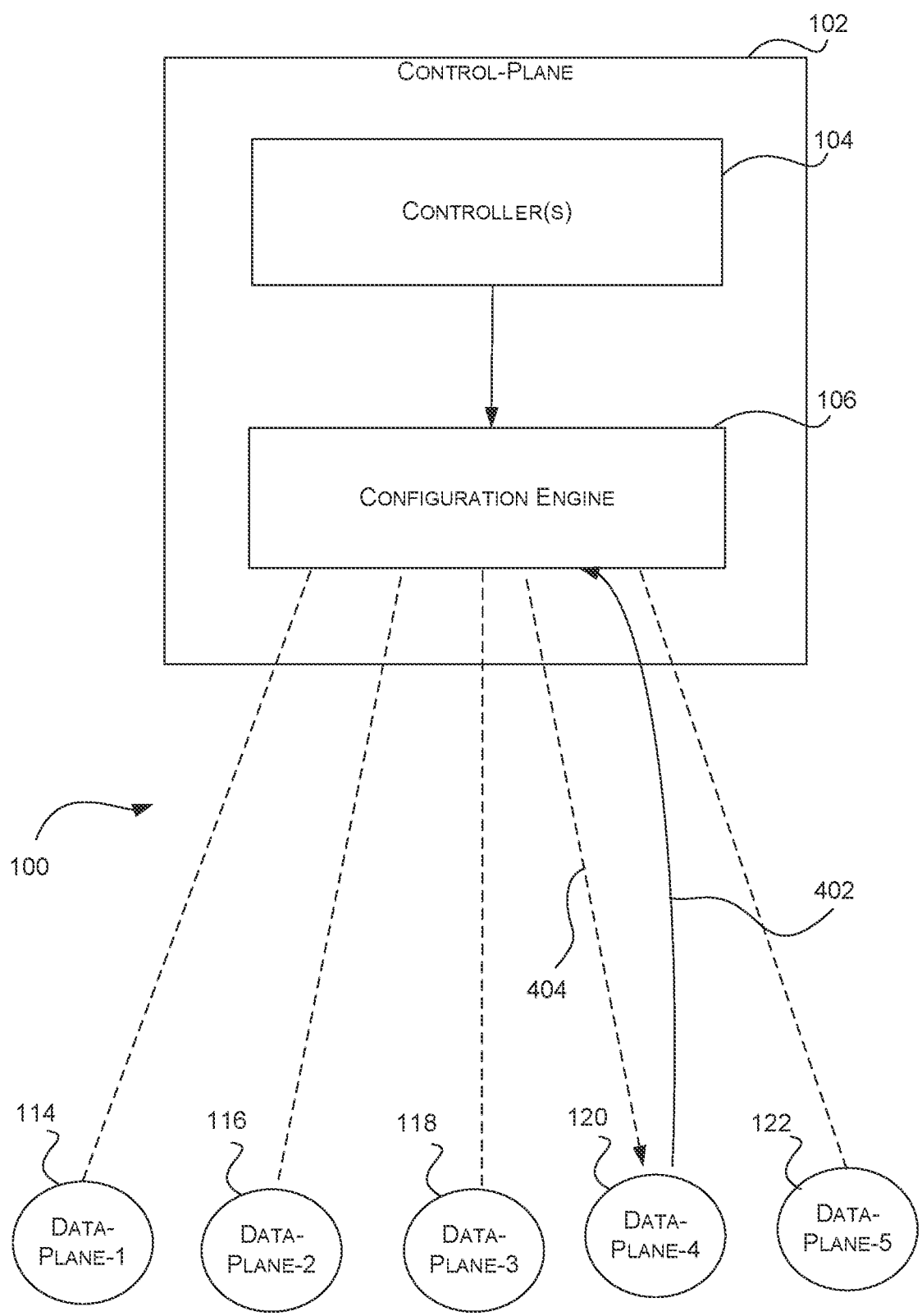
FIG. 4 is an example illustration of the data-plane rejoining the distributed network system.

FIG. 4 is an example illustration of the fourth data-plane 120 rejoining the distributed network system 100. In certain aspects, the fourth data-plane 120 reconnects to the network fabric of the distributed network system 100 and sends a message 402 requesting the control-plane 102 for the active configuration information for each of its interfaces. The request for the control-plane 102 may be intercepted by the configuration engine 106. For example, the configuration daemon 212 executing on the configuration engine 106 may handle the request for active configuration information. In certain implementations, if the active configuration information for the data-plane and the interfaces associated with the data-plane is available in the configuration cache 208, the configuration daemon 212 may forward the active configuration information from the configuration cache 208 to the fourth data-plane 120 (message 404). However, if the active configuration information for the data-plane is not available for the fourth data-plane 120 in the configuration cache 208, then the configuration daemon 212 may walk the hierarchy of information 210 to compile the active configuration information for the fourth data-plane 120 and send the information to the fourth data-plane 120. The fourth data-plane may receive the active configuration data and configure its interfaces so that it can synchronize to the network fabric of the distributed network system 100 and start processing packets.

In another implementation, the configuration engine 106 may detect that the fourth data-plane 120 has reconnected to the distributed network system 100 and may automatically send the active configuration information associated with the fourth data-plane 120 to it.

As described herein, the hierarchy of information 210 stores active configuration information specific to the interfaces for the data-planes and not just a snapshot of the data-plane at the time the data-plane disconnects from the network. In other words, any commands subsequent to the data-plane disconnecting from the network are still reflected in the active configuration information maintained by the hierarchy of information 210 for that data-plane and its associated interfaces. For instance, if a rule is deleted while the data-plane is disconnected, the rule is deleted also from the active configuration information stored for the interface of the disconnected data-plane in the configuration engine 106, if that rule previously applied to the interface of the respective data-plane.

In some instances, the hierarchy of information 210 stores active and inactive configuration information. In certain instances, configuration information may include other data-plane specific configuration information besides interface configuration information associated with the data-plane.

FIGS. 5-11 visually depict an example implementation of a hierarchy of information 210. Many other implementations may be used in representing data associated with a hierarchy of information without deviating from the scope of the invention.

As shown in FIGS. 5-11, a hierarchy of information 210 may be a data structure in which the data is organized into a graph or tree like structure. Data may be stored in nodes that may be connected to each other through links. In some implementations, links may be implemented using memory pointers or indexed records. Each node may be a collection of one or more data elements or meta-data. FIGS. 12A and 12B provide example implementations of a node comprising data elements. In certain implementations of a hierarchy of information 210, the highest level node may be referred to as the root node, followed by lower level nodes. For each node, the nodes in levels above in the hierarchy of information 210 higher than the current node may be referred to as the parent, grand-parent nodes and so on, based on the relative hops between the nodes. Similarly, for each node, the nodes in levels below in the hierarchy of information 210 is lower than the current node may be referred to as the child, grandchild nodes, and so on based on the relative hops between the nodes. In certain implementations, the lowest level nodes in the hierarchy of information may be referred to as the leaf nodes. In certain implementations of the hierarchy of information, each node (besides the root) may have a single (direct) parent, but one or more children.

In FIGS. 5-11, times t0, t1, t2 and so on depicted may refer to the order of the state represented in the hierarchy of information 210 in the figures. For example, the period of time between t0 and t1 may not be the same as the period of time between t1 and t2, and so on.

In certain embodiments, at time t0 the hierarchy of information 210 may not exist or may not be populated. As command sequences may be entered using the command line interface (CLI), graphical user interface (GUI) or any other interface, the hierarchy of information 210 is populated. In some instances, an application or a management process executing as part of the control-plane 102 may provide a command sequence.

At time t2, the configuration engine 106 may receive a command sequence, such as a command sequence, to update the data-planes and their associated interfaces. In addition, the configuration engine 106 may also update the hierarchy of information 210 with the new information from the command sequence.

In the commands or command sequences below, "set" and "delete" are the actions to be performed using the command, followed by the path of the interface and the value associated with the interface. For example, as shown above, "set" may request merging of new configuration data for a command sequence in the hierarchy of information, whereas, "delete" would result in the removal of the path from the data structure. In some instances, the command sequences may be issued to update specific interfaces, yet, in other instances the command sequences may be issued to update "all" sequences. The value may be any value that may be interpreted by the data-plane or the interface associated with the data-plane.

Following is an example command sequence:
set security firewall name foobar rule 100 action accept
set security firewall name foobar rule 100 source address 10.1.0.0/24
commit In certain implementations the above command at time t2, may be represented syntactically as:

```
{
    "firewall": {
        "name": {
            "foobar": {
                "rule": {
                    "100": {
                        "___SET___": "npf fw add foobar 100 pass final from 10.1.0.0/24 to any ",
                        "___INTERFACE___": "ALL"
                    }
                }
            }
        }
    }
}
```

In certain embodiments, an application that needs to forward configuration data from the control-plane 102 to the data-plane may format the configuration data according to the syntax acceptable by the configuration engine 106 (e.g., JSON format). In one example, the format may represent the path to the application node that needs to be the path from the configuration root node to at least the application transaction node in the configuration hierarchy. The path may be considered the key to reach the configuration data. Data represented as "value" for the interface can be in any format, since this format is predetermined between the control-plane and the data-plane and provides the developer the ability to specify the granularity of data sent between the control-planes and the data-planes. In certain embodiments, the root of the hierarchical database may contain a hint regarding the association with the specific interface.

The hierarchy of information 210 may store up to date representation sent by the controller. In certain embodiments, the key to the configuration data stored may be the path to the node. Updates to this representation by the controller may replace the cached data as indexed by the key. Data initiated from the controller may be passed through to the appropriate data-planes, while a resynchronization request from the data-plane may result in the full contents of the cache being sent to the data-plane.

Figure 5:
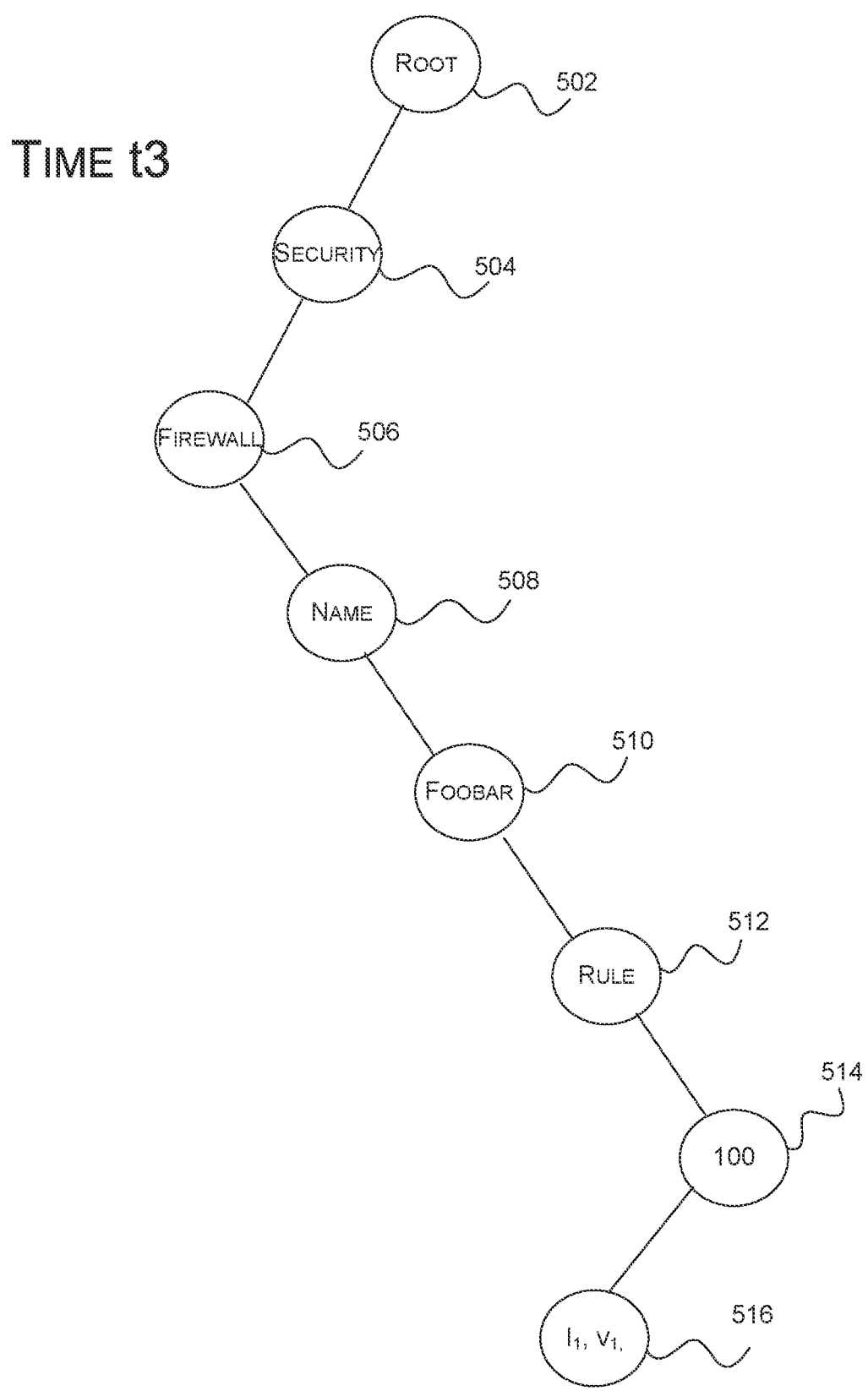
FIG. 5 is an example visual representation of a hierarchy of information at a first time.

FIG. 5 is an example visual representation of the hierarchy of information 210 at time t3, updated in response to the commands executed at time t2, as shown above. As shown in FIG. 5, the command sequence is parsed left to right delimited by space and each portion is used to populate corresponding nodes in the hierarchy of information 210. It should be noted that the command at time t2 represents an example syntax for a command, and different types of syntax and forms may be used for issuing a command sequence. For example, in one instance, the portions of the command may be delimited by commas, colons, semi-colons or any other pre-defined character. In yet other implementations, the command may be entered using a graphical user interface instead of a command line interface, wherein either the command sequence is inferred or derived from the fields of the graphical user interface populated. In yet other instances, portions of the commands may be hidden or abbreviated, using techniques such as aliasing.

Referring back to the command sequence from time t2, the position of the portion of the command sequence in the command sequence may determine the level in the hierarchy in the hierarchy of information 210 for that portion of the command sequence. For example, parsing the command sequence left to right, the first portion from the command sequence is "security" and is stored at node 504 and linked to the root node 502 of the hierarchy of information 210. Second is "firewall" that is stored at node 506 and linked to the security node 504. Third is "name" and stored at node 508 and linked to the firewall node 506. Fourth is "foobar" and is stored at node 510 and linked to the name node 508. Fifth is "rule" and is stored at node 512 and linked to the foobar node 510. Sixth is the rule number (i.e., 100) that is stored at node 514 and linked to the rule node 512. In the above command sequences, the source address 10.1.0.0/24 may signify a specific interface ($I_1$) for an action and may be stored at the leaf node 516 and linked to the rule 100 node (514) along with an action or value associated with the interface. The action associated with the command may be any action that may be decipherable by the data-plane or the interface associated with the data-plane.

Although, as described above, the command sequence may be converted to hierarchy of information, this association is exemplary and any hierarchical data structure may be used without deviating from the scope of the invention.

In addition to updating the hierarchy of information 210, the configuration engine 106 may update the values for the data-plane/interface in the configuration cache 208 and also send out the specific command to the one or more data-planes/interfaces for updating their respective state.

Figure 6:
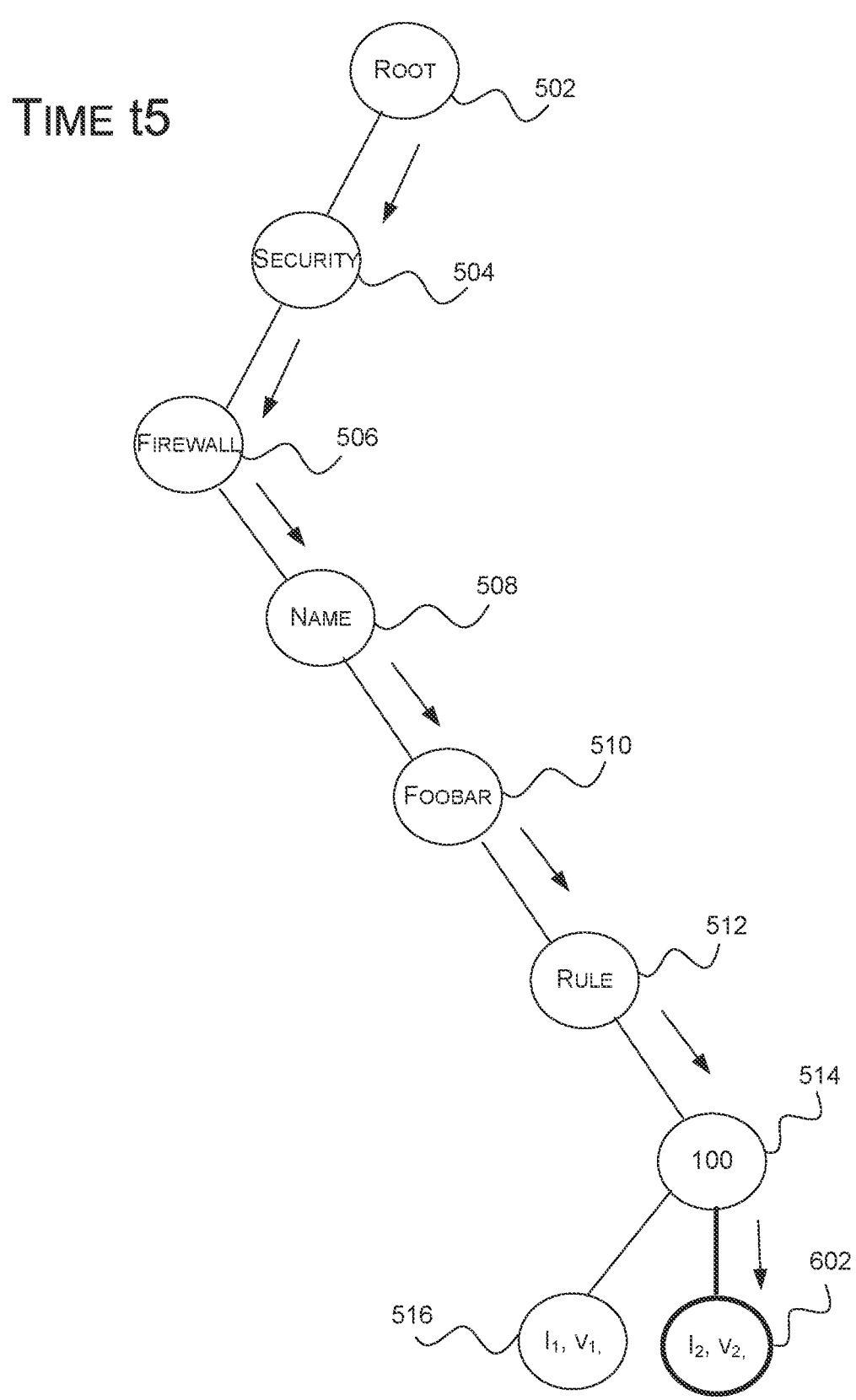
FIG. 6 is an example visual representation of the hierarchy of information at a second time.

At time t4, a second command sequence may be issued adding another interface/value pair to rule 100 of FIG. 4.
set security firewall name foobar rule 100 action accept
set security firewall name foobar rule 100 source address 10.1.0.0/28
commit As shown in FIG. 6, since an interface/value pair is added using a similar command sequence at time t5 as at time t2, the configuration engine 106 parses the command sequence from left to right, and for each portion of the command sequence traverses the configuration hierarchy of information 210 represented in FIG. 5 until a match is found. If no match is found, a new node is created. Based on the command sequence from time t4, no new nodes are added to the hierarchy besides adding a new interface/value leaf node (node 602).

As shown in FIG. 6, multiple command sequences with repetitive portions are merged together into the hierarchy of information 210, allowing for a more robust representation of the command sequences issued by the one or more controllers 104 over a period of time.

Figure 7:
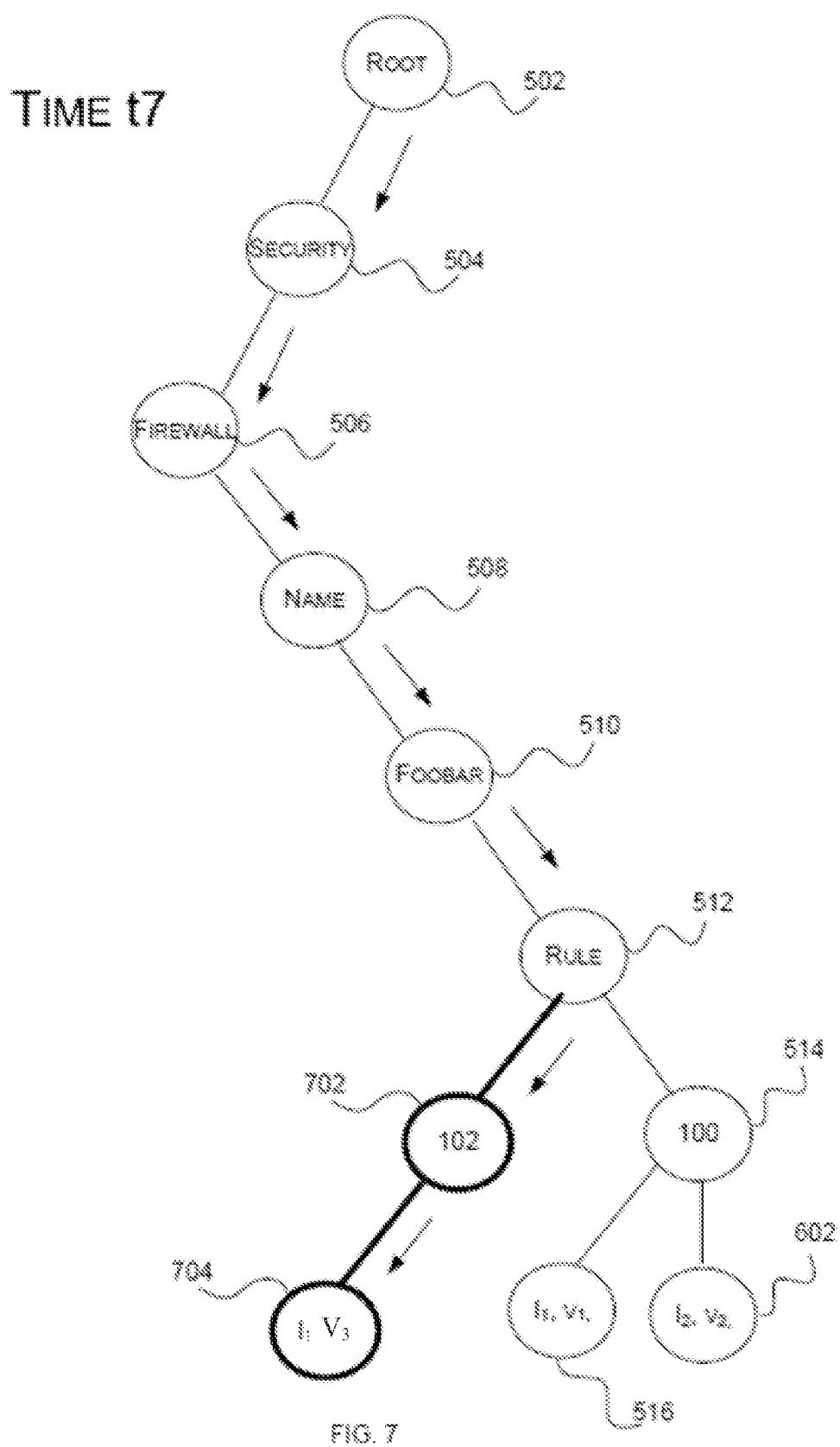
FIG. 7 is an example visual representation of the hierarchy of information at a third time.

At time t6, another command sequence may be issued adding another rule (i.e., 102) to foobar for the first interface disclosed in FIG. 5.
set security firewall name foobar rule 102 action accept
set security firewall name foobar rule 102 source address 10.1.0.0/24
commit As shown in FIG. 7, the hierarchy of information, at time t7, represents the configuration information up to and including the configuration information from the command sequence executed at time t6. As discussed previously, the portions of the command sequences with repetitive portions are merged together into the configuration hierarchy of information. The command sequence is parsed from left to right and traversed down the configuration hierarchy of information until no match is found. In FIG. 7, the portions, security, firewall, name, foobar, and rule are command sequences previously executed and reflected in the hierarchy of information 210, however, the command sequence has a new rule for the first interface. Therefore, to represent the new rule, a new node (node 702) is added to the hierarchy of information 210 to represent the new rule (i.e., rule 102) and another new node (node 704) is added to represent the interface and value associated with the interface (as shown by the bolded lines and circles in FIG. 7).

At time t8, another command sequence may be issued by the controller, as follows:
set security firewall name barbax rule 302 action accept
set security firewall name barbax rule 302 source address 10.1.0.0/24
commit The command sequence executed at time t8 has a different name and rule for a security firewall setting for the first interface than the rules discussed at times t2 and t4.

Figure 8:
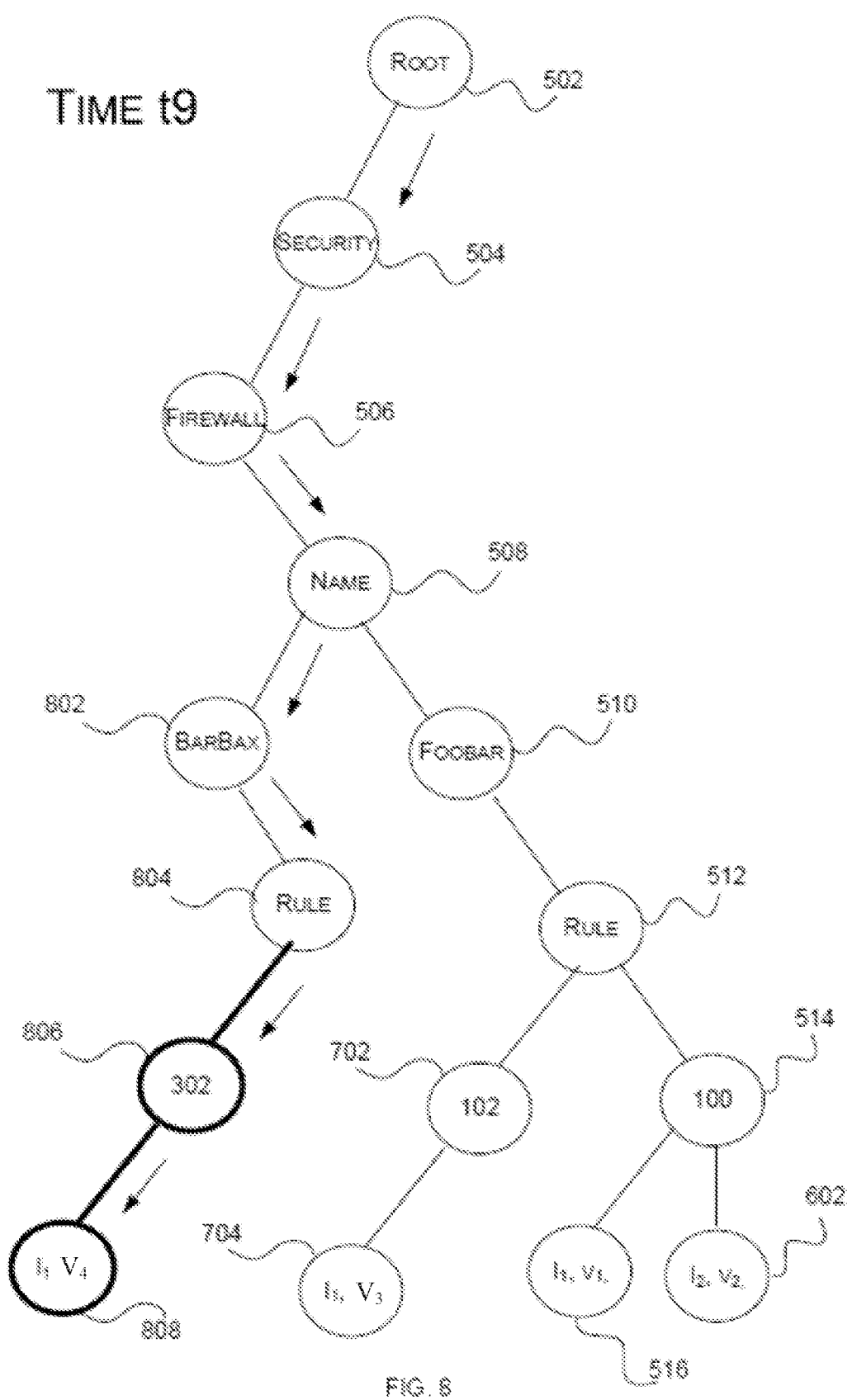
FIG. 8 is an example visual representation of the hierarchy of information at a fourth time.

As shown in FIG. 8, the hierarchy of information 210, at time t9, represents the configuration information up to and including the configuration information from the command sequence executed at time t8. The command sequence from time t8 has a different name and therefore diverges from the previous commands at the name node 508. Therefore, the hierarchy of information 210 represented at time t9, in FIG. 8, has additional nodes for the new name "BarBax" (node 802), rule node (node 804), rule number 302 (node 804), and the first interface (i.e., I1, V4) (node 808).

Next, in one example scenario, at time t10, the fourth data-plane 120, as shown in FIG. 3, comprising the first interface discussed in FIGS. 5-8, may disconnect from the network fabric associated with the distributed network system 100.

In one implementation, in the configuration engine 106, as the hierarchy of information 210 is updated, so are active entries in the configuration cache 208. In other implementations, the entries of the configuration cache 208 may only be generated and/or updated at the time the configuration information is replayed for a re-connecting data-plane or interface from the hierarchy of information 210. In such an implementation, the configuration daemon 212 may walk the hierarchy of information 210 to extract the configuration information for the requested data-plane/interface, but in addition also update the configuration cache 208. Other eviction and protocols for building the configuration cache may be used without deviating from the scope of the invention.

FIG. 9 illustrates an example implementation of the configuration cache 208. The state of the various data-planes and interfaces may be cached in the configuration cache 208 for faster retrieval. At time t10, the state of the configuration cache 208 for the fourth data-plane 120 and interface 1 may be represented by the cache entries 902 in FIG. 9. The representation of the configuration cache 208 in FIG. 9 is an example representation, and may not provide all the well-known details associated with implementing a cache.

At a later point in time, as shown in FIG. 4, the fourth data-plane 120 and its associated interface 1 may reconnect to the network fabric of the distributed network system 100. If the fourth data-plane 120 reconnects before any changes are made to the portions of the command sequences relevant to interface 1 of the fourth data-plane 120, then the configuration daemon 212 may just replay the configuration information 902 stored in the configuration cache 208 for the fourth data-plane 120, as shown in FIG. 8. This saves the configuration engine 106 the time and resources of having to walk the hierarchy of information 210 to retrieve the configuration information for the interface 1 of the fourth data-plane 120. However, if changes are made to the configuration data for interface 1, then the configuration information for the interface may be evicted from the configuration cache 208 and the configuration daemon 212 may traverse the hierarchy of information 210 to retrieve the latest configuration information for the first interface 1 of the fourth data-plane 120 and replay that information to the fourth data-plane 120.

Figure 10:
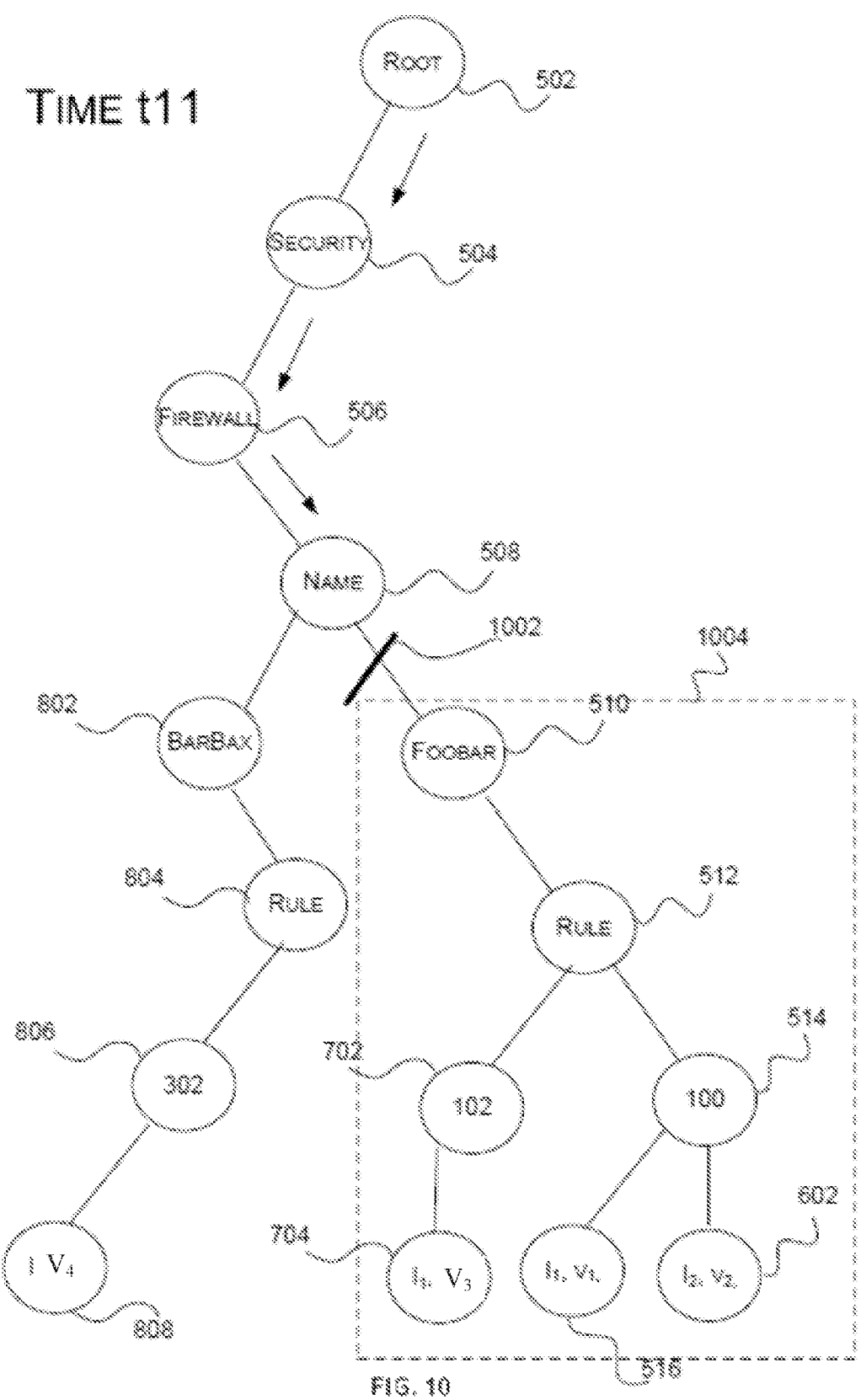
FIG. 10 illustrates deletion of a node in the hierarchy of information.

After the fourth data-plane 120 reconnects to the distributed network system 100, at time t11, another command sequence may be issued to delete certain configuration information from the interfaces. For example, a delete command may be executed as follows:
delete security firewall name foobar
commit In response to the execution of command at time t11, FIG. 10 shows the deletion of all the nodes including the foobar and everything below foobar in the hierarchy of information 210 with the execution and committing of a single instruction. Upon execution of the command from time t11, all the nodes (510, 512, 514, 602, 516, 702 and 704) in the dotted box 1004 and the link 1002 connecting name node 508 and the foobar node 510 are automatically deleted by deleting foobar.

Figure 11:
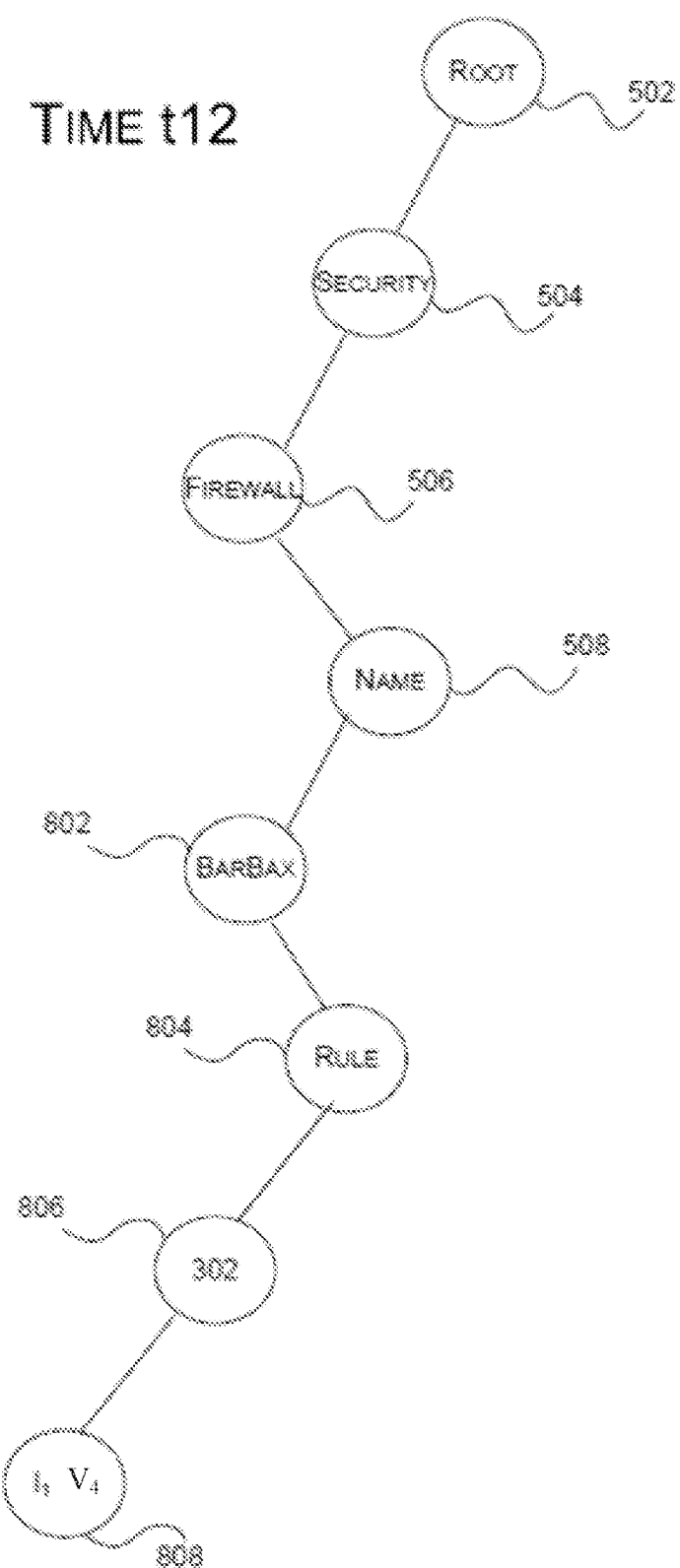
FIG. 11 illustrates the hierarchy of information after the deletion of nodes, described in FIG. 10.

An updated hierarchy of information 210, at time t12, is shown in FIG. 11 and represents the configuration information up to and including the configuration information from the command sequence executed at time t11. After or during the update of the hierarchy of information 210, individual commands may also be sent to the individual interfaces to update the configuration.

In another scenario, the fourth data-plane 120 may not reconnect until after the completion of the delete command at time t11 is executed and committed. For instance, the fourth data-plane 120 may reconnect to the distributed network system 100 at time t13 along with the first interface (i.e., $I_1$). At this time, the active configuration information is different than what the active configuration information was at time t9 (i.e., shown in FIG. 8 and FIG. 9). Since, the hierarchy of information 210 is dynamic and maintains active configuration information for the interface, the updated configuration information in the data structure no longer has the information associated with rules 100 and 102 for the first interface, since these rules were deleted by the command sequence executed at time t11. Therefore, in this scenario, the configuration daemon 212 from the configuration engine 106 updates the fourth data-plane 120 with rule 302 and the associated values stored downstream.

Therefore, the hierarchy of information 210 provides a unified way of representing the configuration information for the interfaces associated with the network fabric for the distributed network system 100. If data-planes and the associated interfaces leave and reconnect, the configuration hierarchy data structure 210 provides a robust means for reconfiguring the interfaces with active configuration information for the interface that is updated even when the interface itself is disconnected from the network fabric of the distributed network system 100.

In addition to the commands above, additional commands may be executed by the control-plane to set the interface/value pair. For example:
set interfaces dataplane dp0port1 firewall in foobar
commit The command above provides the assignment to the interface "dp0port1." Without the assignment, the interface hint may be unassigned. Additionally, a firewall can be assigned to many interfaces, i.e.
set interfaces dataplane dp0port1 firewall in foobar
set interfaces dataplane dp2port4 firewall out foobar
commit In the above instance, the interface value is "dp0port1, dp2port4".

FIG. 12A represents an example implementation of a node that may be maintained by the configuration engine 106 in the hierarchy of information 210. FIG. 12B represents a particular syntactical representation of the node from FIG. 12A. It should be noted that various different programming languages and syntactical representations may be used for representing a node or implementing the hierarchy of information 210 without deviating from the scope of the invention.

In FIG. 12A and FIG. 12B, the "hash" may be a pointer to the location of the tree where the hierarchy of information 210 exists. The "value" in the node data structure may be the command or the value associated with the action. The "topic" is a directed value used to dispatch the command to a specific feature handler within the data-plane. In other words, it allows commands to be directed to specific software/hardware handlers within the data-plane. For example, the topic value may allow the controller (or control-plane) to direct commands to specific handlers, such as firewall, routing, vpn, etc. within the various data-planes.

The "interface" is the specific interface associated with the command sequence. The interface value can be applied to any node. For example, a collection of nodes may be applied to a specific interface. A leaf node (or child node) may override the interface value at an intermediate node.

The "sequence" is the order the command was received by the controller and then inserted into the tree. The configuration daemon 212 can replay the ordered current state of the active configuration on a per-interface basis using the information stored in the data structure, such as the sequence number, at each of the nodes. For example, if a firewall is created by one command and activated by another command subsequent to the creation of the firewall, it may be important to remember the sequence of the execution of the commands so that they can be replayed in that specific order. The sequence number provides an ordering or numbering of the commands so that the sequence is remembered and replayed in order.

In certain embodiments, techniques described in the disclosure allow the controller to manage a scalable number of data-planes with a large number of different configuration settings and rules. In some instances, the data-planes connected to the network fabric of the distributed network system 100 may dynamically leave and join the network fabric. The configuration engine 102, operating as part of the control-plane is adapted to quickly reconfigure the data-plane that rejoins the network fabric with the latest configuration data (i.e., active configuration information) using the data stored in the hierarchy of information 210 for that data-plane.

Figures above describe an illustrative scenario for building and updating the hierarchy of information 210. However, in practice, the hierarchy of information 210 may support several thousands of nodes for storing configurations for many command sequences for a large number of data-planes and interfaces associated with the data-planes. For example, in some systems, the hierarchy of information 210 may store all the configuration information as a result of all the command sequences executed by the one or more controllers 104 since the power up sequence of the control-plane 102.

The defined interface also allows the user or system to interact and manipulate the data-planes and interfaces with high level commands—without detailed knowledge of the topology. For example, the user may provide a command sequence to delete the firewall and commit A single command sequence at the root can delete the configuration on all the interfaces associated with the firewall setup. Furthermore, in certain embodiments, each node may store a timestamp, order or sequence number associated with the command sequences and the commands may be replayed in a time order and not necessarily all at once, maintaining any temporal associations for the commands.

In certain embodiments, aspects of the disclosure enable robust maintenance of large flat L2 networks with millions of hosts with a network fabric that can handle address resolution protocols (ARPs) for a large number of systems. In certain implementations, the control-plane can be agnostic of the nature and structure of the data-planes and the interfaces associated with the data-planes which allows for extensibility of the system. For instance, if a completely different kind of data-plane shows up the controller can still configure and store the information in the hierarchy of information and manage the data-plane.

Figure 13:
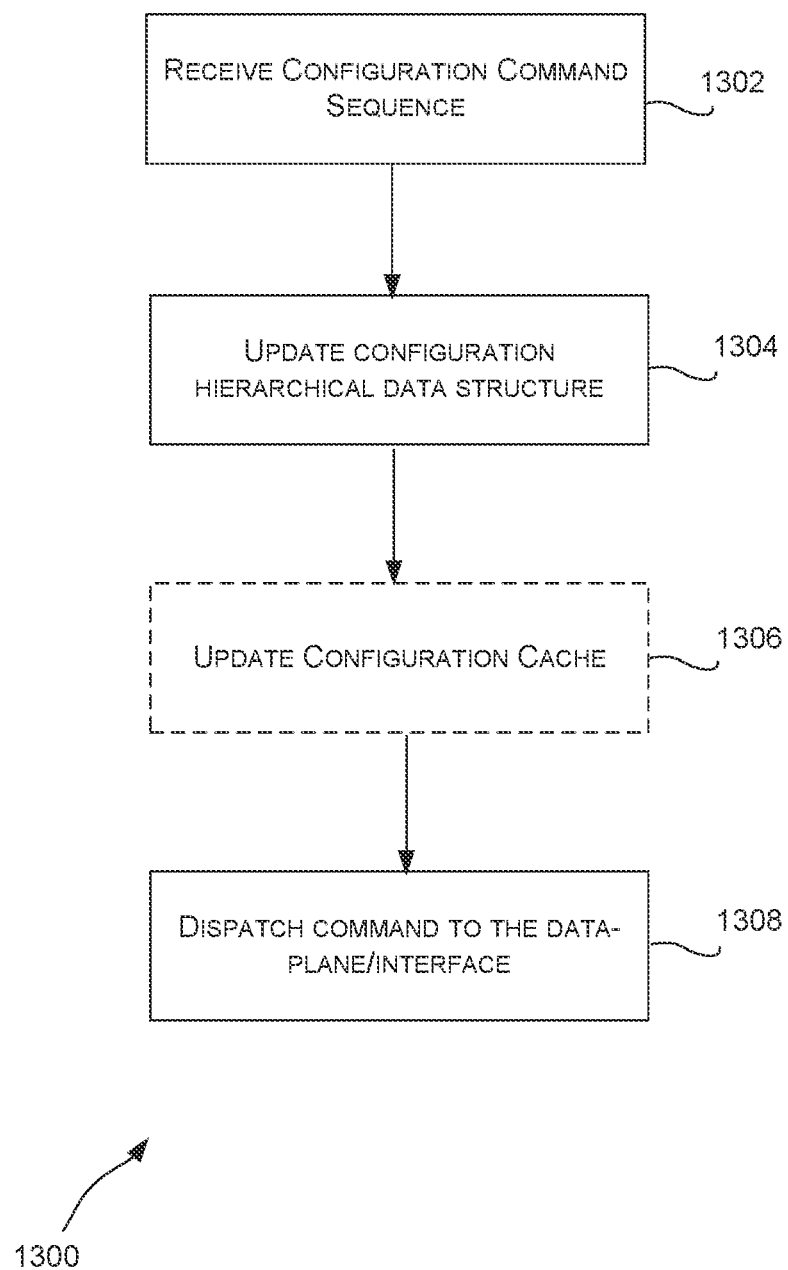
FIG. 13 is an example flowchart illustrating methods according to certain aspects of the disclosure.

FIG. 13 is a flow diagram illustrating a method for performing embodiments of the invention according to one or more illustrative aspects of the disclosure. According to one or more aspects, any and/or all of the methods and/or method steps described herein may be implemented by and/or in a computing device 1500 or a network device 1600. In some instances, a processing entity and/or device executing as the configuration engine 106 may perform one or more steps of the method of FIG. 13. In some instances, a virtual machine or virtual device executing on the computing device 1500 may implement one or more steps of the method 1300. In one embodiment, one or more of the method steps described below with respect to FIG. 13 are implemented by a processing entity of a computing device 1500, such as the processor 1310 or another processor. Additionally or alternatively, any and/or all of the methods and/or method steps described herein may be implemented in computer-readable instructions, such as computer-readable instructions stored on a computer-readable medium such as the memory 1535, storage 1525 or another computer-readable medium.

The flowchart 1300 illustrates an example method flow for storing a command sequence in a hierarchy of information 210. At block 1302, components of a computing device, such as the configuration engine 106 receives a command sequence.

At block 1304, components of the computing device, such as the configuration engine 106, may update the hierarchy of information 210. Updating of the hierarchy of information 210 is described in more detail with reference to FIGS. 5-11.

At block 1306, components of the computing device, such as the configuration engine 106, may optionally also update the configuration cache 208. In some instances, the configuration cache 208 may be updated at the time a request for configuration information is received from the data-plane and service by the configuration daemon 212 (as described in FIG. 14) instead.

At block 1308, components of the computing device, such as the configuration engine 106 may also dispatch the command to the data-plane. In some instances, the hierarchy of information 210 in block 1304 and the dispatching of the command to the data-plane may be performed in parallel or in any other order with respect to each other.

It should be appreciated that the specific steps illustrated in FIG. 13 provide a particular method of switching between modes of operation, according to an embodiment of the present invention. Other sequences of steps may also be performed accordingly in alternative embodiments. For example, alternative embodiments of the present invention may perform the steps outlined above in a different order. Furthermore, additional steps or variations to the steps may be added or removed depending on the particular applications. One of ordinary skill in the art would recognize and appreciate many variations, modifications, and alternatives of the process.

Figure 14:
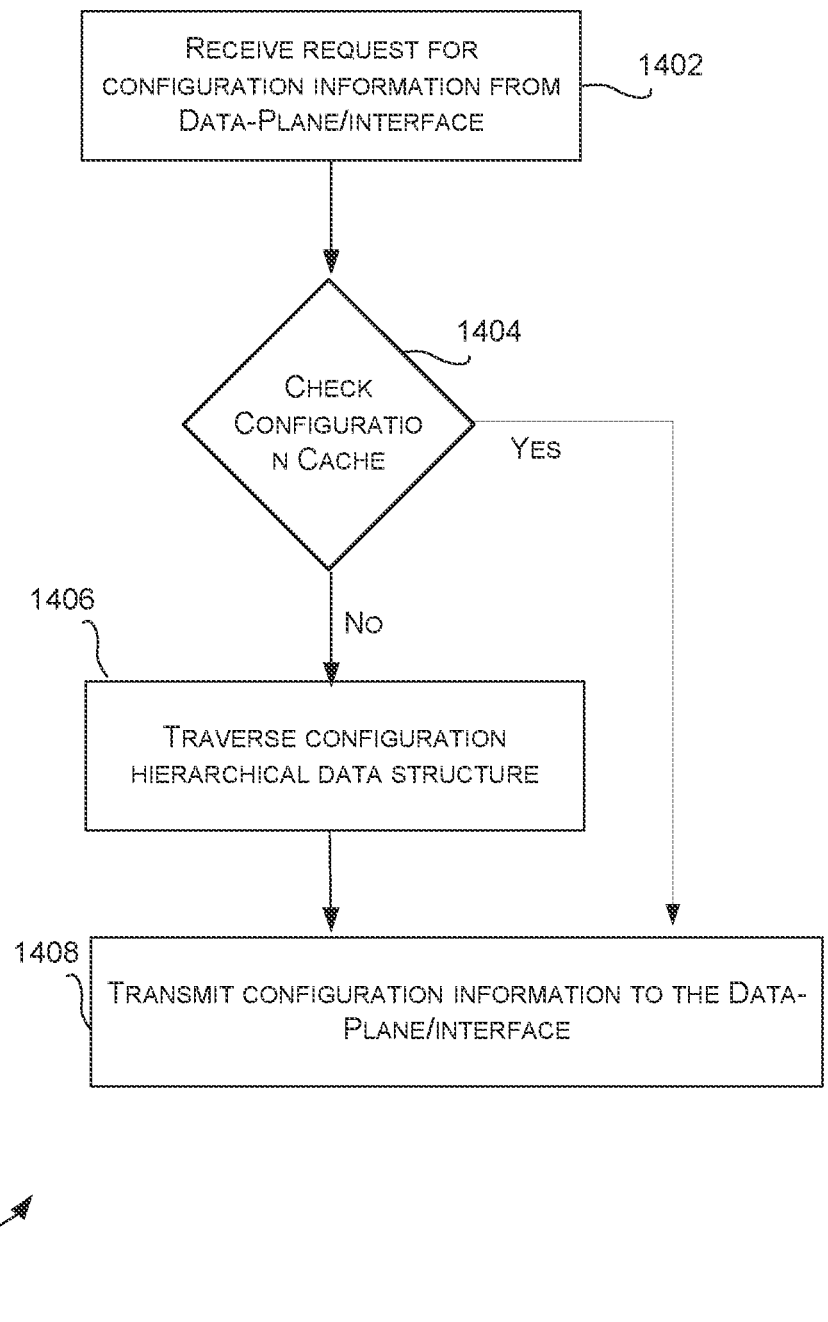
FIG. 14 is an example flowchart illustrating methods according to certain aspects of the disclosure.

FIG. 14 is a flow diagram illustrating a method for performing embodiments of the invention according to one or more illustrative aspects of the disclosure. According to one or more aspects, any and/or all of the methods and/or method steps described herein may be implemented by and/or in a computing device 1500 or a network device 1600. In some instances, a processing entity and/or device executing as the configuration engine 106 may perform one or more steps of the method of FIG. 14. In some instances, a virtual machine or virtual device executing on the computing device 1500 may implement one or more steps of the method 1400. In one embodiment, one or more of the method steps described below with respect to FIG. 14 are implemented by a processing entity of a computing device 1500, such as the processor 1410 or another processor. Additionally or alternatively, any and/or all of the methods and/or method steps described herein may be implemented in computer-readable instructions, such as computer-readable instructions stored on a computer-readable medium such as the memory 1535, storage 1525 or another computer-readable medium.

The flowchart 1400 illustrates an example method flow for retrieving configuration information for a data-plane from the control-plane 102. At block 1402, components of a computing device, such as the configuration engine 106 receives a request for configuration information for a data-plane. In certain implementations, instead of receiving a request for configuration information, the configuration engine 106 may receive an indication that a data-plane has reconnected to the network fabric of the distributed network system 100 and respond to this indication with configuration information for the data-plane.

At block 1404, components of the computing device, such as the configuration engine 106, may check if the configuration information for the one or more interfaces for the data-plane is in the configuration cache 208. If the configuration information is available in the configuration cache 208, the configuration engine 106, via the configuration daemon 212, at block 1408, may transmit the configuration information to the data-plane. It should be noted that maintaining a configuration cache 208 and using the configuration cache 208 for servicing requests from the data-planes may be optional.

If the configuration cache 208 is not implemented or if the configuration information for the data-plane and/or interface associated with the data-plane is not in the configuration cache 208, the configuration daemon 212 may walk the hierarchy of information 210 and retrieve the configuration information for the data-plane and its interface. For instance, referring to the graph of FIG. 8, the configuration daemon 212 may walk the hierarchy of information 210 to find all the leaves with values for the data-plane interface.

At block 1406, once the configuration information is retrieved, the configuration engine 106 may transmit the configuration information to the data-plane.

It should be appreciated that the specific steps illustrated in FIG. 14 provide a particular method of switching between modes of operation, according to an embodiment of the present invention. Other sequences of steps may also be performed accordingly in alternative embodiments. For example, alternative embodiments of the present invention may perform the steps outlined above in a different order. Furthermore, additional steps or variations to the steps may be added or removed depending on the particular applications. One of ordinary skill in the art would recognize and appreciate many variations, modifications, and alternatives of the process.

Figure 15:
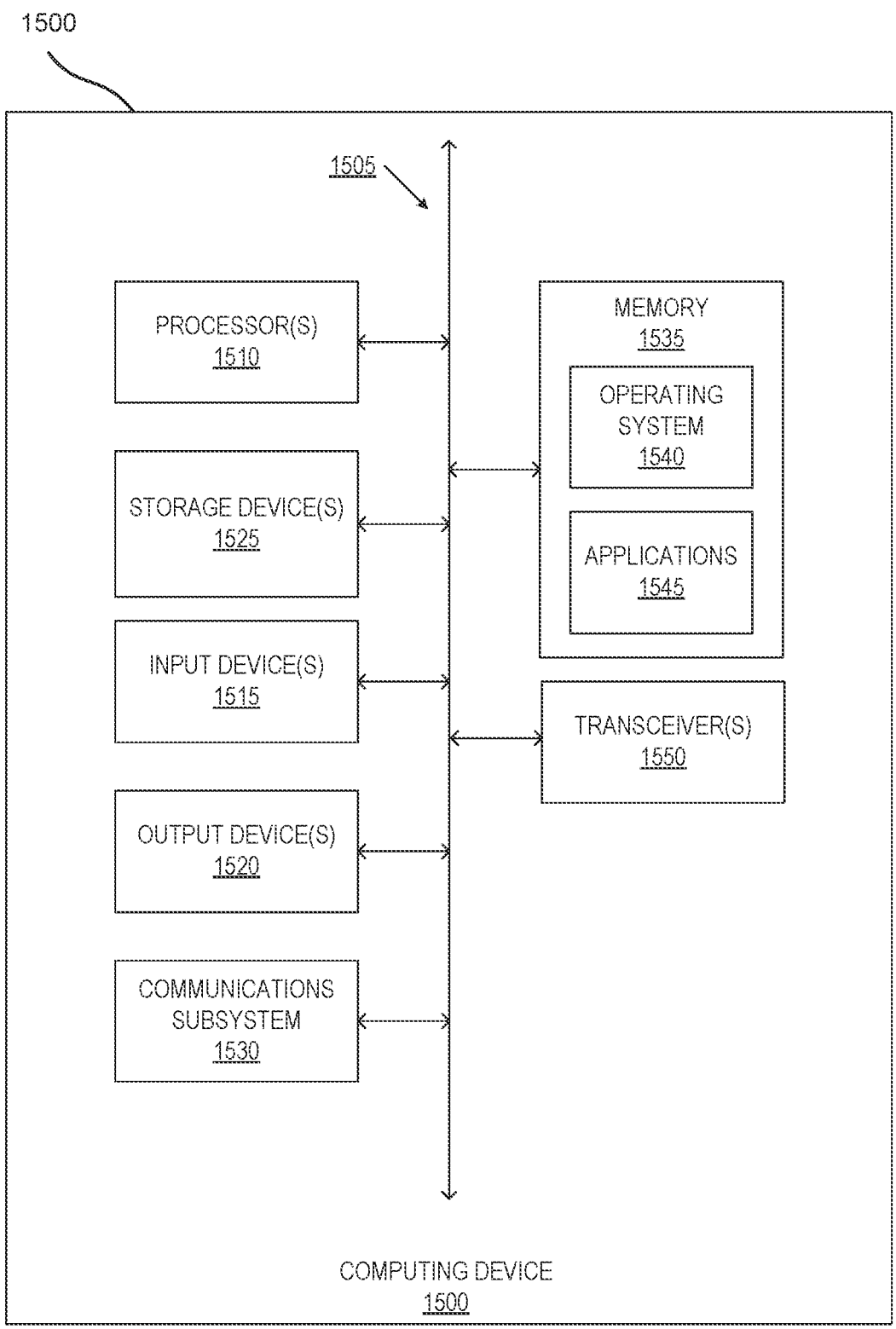
FIG. 15 is a block diagram of a computing device according to some embodiments.

Having described multiple aspects of a configuration engine 106, an example of a computing system in which various aspects of the disclosure may be implemented will now be described with respect to FIG. 15. According to one or more aspects, a computer system as illustrated in FIG. 15 may be incorporated as part of the configuration engine 106, which may implement, perform, and/or execute any and/or all of the features, methods, and/or method steps described herein. For example, computer system 1500 may represent some of the components of the configuration engine 106. In some embodiments, the system 1500 is configured to implement any of the methods described above. FIG. 15 provides a schematic illustration of one embodiment of a computer system 1500 that can perform the methods provided by various other embodiments, as described herein, and/or can function a network device or components of a network device or distributed network system 100. FIG. 15 is meant only to provide a generalized illustration of various components, any and/or all of which may be utilized as appropriate. FIG. 15, therefore, broadly illustrates how individual system elements may be implemented in a relatively separated or relatively more integrated manner.

The computer system 1500 is shown comprising hardware elements that can be electrically coupled via a bus 1505 (or may otherwise be in communication, as appropriate). The hardware elements may include one or more processors 1510, including without limitation one or more general-purpose processors and/or one or more special-purpose processors (such as digital signal processing chips, graphics acceleration processors, and/or the like); one or more input devices 1515, which can include without limitation wireless receivers, wireless sensors, a mouse, a keyboard and/or the like; and one or more output devices 1520, which can include without limitation a display unit, a printer and/or the like.

In some embodiments, the one or more processor 1510 may be configured to perform a subset or all of the functions described above with respect to FIG. 15. The processor 1510 may comprise a general processor and/or and application processor, for example. In some embodiments, the processor is integrated into an element that processes visual tracking device inputs and wireless sensor inputs.

The computer system 1500 may further include (and/or be in communication with) one or more non-transitory storage devices 1525, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 1500 might also include a communications subsystem 1530, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 1530 may permit data to be exchanged with a network (such as the network described below, to name one example), other computer systems, and/or any other devices described herein. In many embodiments, the computer system 1500 will further comprise a non-transitory working memory 1535, which can include a RAM or ROM device, as described above. In some embodiments communications subsystem 1530 may interface with transceiver(s) 1550 configured to transmit and receive signals from access points or mobile devices. Some embodiments may include a separate receiver or receivers, and a separate transmitter or transmitters.

The computer system 1500 also can comprise software elements, shown as being currently located within the working memory 1535, including an operating system 1540, device drivers, executable libraries, and/or other code, such as one or more application programs 1545, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIG. 15, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1525 described above. In some cases, the storage medium might be incorporated within a computer system, such as computer system 1500. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1500 and/or might take the form of source and/or installable code, which, upon compilation and/or installation on the computer system 1500 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 1500) to perform methods in accordance with the disclosure. For example, some or all of the procedures of the described methods may be performed by the computer system 1500 in response to processor 1510 executing one or more sequences of one or more instructions (which might be incorporated into the operating system 1540 and/or other code, such as an application program 1545) contained in the working memory 1535. Such instructions may be read into the working memory 1535 from another computer-readable medium, such as one or more of the storage device(s) 1525. Merely by way of example, execution of the sequences of instructions contained in the working memory 1535 might cause the processor(s) 1510 to perform one or more procedures of the methods described herein, for example methods described with respect to FIG. 15.

The terms "machine-readable medium" and "computer-readable medium," as used herein, refer to any medium that participates in providing data that causes a machine to operate in a specific fashion. In an embodiment implemented using the computer system 1500, various computer-readable media might be involved in providing instructions/code to processor(s) 1510 for execution and/or might be used to store and/or carry such instructions/code (e.g., as signals). In many implementations, a computer-readable medium is a physical and/or tangible storage medium. Such a medium may take many forms, including, but not limited to, non-volatile media, volatile media, and transmission media. Non-volatile media include, for example, optical and/or magnetic disks, such as the storage device(s) 1525. Volatile media include, without limitation, dynamic memory, such as the working memory 1535. Transmission media include, without limitation, coaxial cables, copper wire and fiber optics, including the wires that comprise the bus 1505, as well as the various components of the communications subsystem 1530 (and/or the media by which the communications subsystem 1530 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1500. These signals, which might be in the form of electromagnetic signals, acoustic signals, optical signals and/or the like, are all examples of carrier waves on which instructions can be encoded, in accordance with various embodiments of the invention.

The communications subsystem 1530 (and/or components thereof) generally will receive the signals, and the bus 1505 then might carry the signals (and/or the data, instructions, etc. carried by the signals) to the working memory 1535, from which the processor(s) 1510 retrieves and executes the instructions. The instructions received by the working memory 1535 may optionally be stored on a non-transitory storage device 1525 either before or after execution by the processor(s) 1510. Memory 1535 may contain at least one database according to any of the databases and methods described herein. Memory 1535 may thus store any of the values discussed in any of the present disclosures, including FIGS. 1, 2, 3, 4, 5, 6, 7, 8, 9, 10, 11, 12, 13, 14 and related descriptions.

The methods described in FIG. 13 and FIG. 14 may be implemented by various blocks in FIG. 15. For example, processor 1510 may be configured to perform any of the functions of blocks in flowchart 1300 and flowchart 1400. Storage device 1525 may be configured to store an intermediate result, such as a globally unique attribute or locally unique attribute discussed within any of blocks mentioned herein. Storage device 1525 may also contain a database consistent with any of the present disclosures. The memory 1535 may similarly be configured to record signals, representation of signals, or database values necessary to perform any of the functions described in any of the blocks mentioned herein. Results that may need to be stored in a temporary or volatile memory, such as RAM, may also be included in memory 1535, and may include any intermediate result similar to what may be stored in storage device 1525. Input device 1515 may be configured to receive wireless signals from satellites and/or base stations according to the present disclosures described herein. Output device 1520 may be configured to display images, print text, transmit signals and/or output other data according to any of the present disclosures.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Features described with respect to certain embodiments may be combined in various other embodiments. Different aspects and elements of the embodiments may be combined in a similar manner Technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. A number of steps may be undertaken before, during, or after the above elements are considered. Accordingly, the above description does not limit the scope of the disclosure.

Various examples have been described. These and other examples are within the scope of the following claims.

Figure 16:
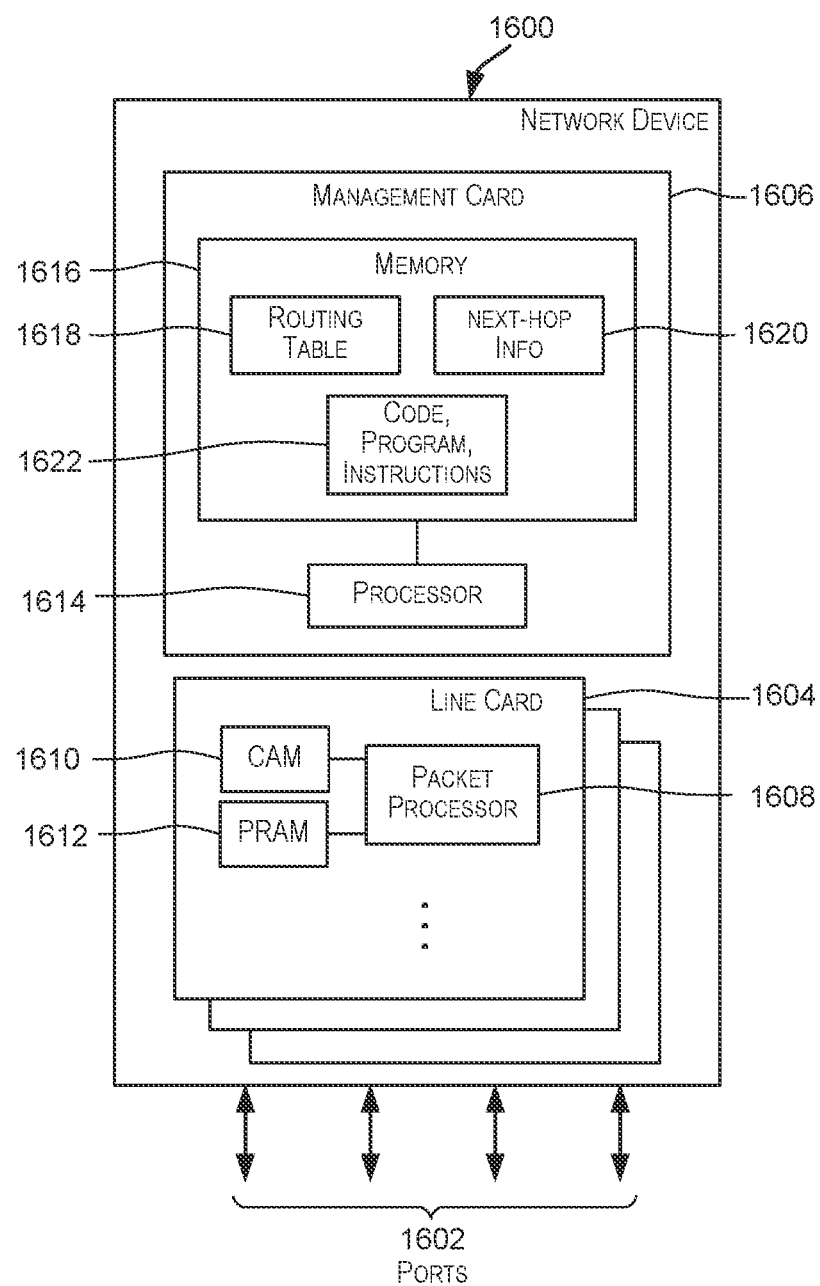
FIG. 16 depicts a simplified block diagram of a network device that may be configured to perform embodiments of the present invention.

FIG. 16 depicts a simplified block diagram of a network device 1600 that may be configured to perform embodiments of the present invention. For example, components described with reference to FIG. 16 may be used to implement certain aspects of a controller, VPlane, data-plane, and an interface associated with an data-plane. The network device 1600 illustrates only one management card and linecard for illustrating purposes, but may be extended to provide multiple management cards and linecards. Network device 1600 may be a router or switch that is configured to forward data such as a router or switch provided by Brocade Communications Systems, Inc. In the embodiment depicted in FIG. 16, network device 1600 comprises a plurality of ports 1602 for receiving and forwarding data packets and multiple cards that are configured to perform processing to facilitate forwarding of the data packets. The multiple cards may include one or more linecards 1604 and one or more management cards 1606. A card, sometimes also referred to as a blade or module, can be inserted into the chassis of network device 1600. This modular design allows for flexible configurations with different combinations of cards in the various slots of the device according to differing network topologies and switching requirements. The components of network device 1600 depicted in FIG. 16 are meant for illustrative purposes only and are not intended to limit the scope of the invention in any manner Alternative embodiments may have more or fewer components than those shown in FIG. 16.

Ports 1602 represent the I/O plane for network device 1600. Network device 1600 is configured to receive and forward data using ports 1602. A port within ports 1602 may be classified as an input port or an output port depending upon whether network device 1600 receives or transmits a data packet using the port. A port over which a data packet is received by network device 1600 is referred to as an input port. A port used for communicating or forwarding a data packet from network device 1600 is referred to as an output port. A particular port may function both as an input port and an output port. A port may be connected by a link or interface to a neighboring network device or network. Ports 1602 may be capable of receiving and/or transmitting different types of data traffic at different speeds including 1 Gigabit/sec, 10 Gigabits/sec, or more. In some embodiments, multiple ports of network device 1600 may be logically grouped into one or more trunks.

Upon receiving a data packet via an input port, network device 1600 is configured to determine an output port for the packet for transmitting the data packet from the network device to another neighboring network device or network. Within network device 1600, the packet is forwarded from the input network device to the determined output port and transmitted from network device 1600 using the output port. In one embodiment, forwarding of packets from an input port to an output port is performed by one or more linecards 1604. Linecards 1604 represent the data forwarding plane of network device 1600. Each linecard 1604 may comprise one or more packet processing entities 1608 that are programmed to perform forwarding of data packets from an input port to an output port. A packet processing entity on a linecard may also be referred to as a line processing entity. Each packet processing entity 1608 may have associated memories to facilitate the packet forwarding process. In one embodiment, as depicted in FIG. 16, each packet processing entity 1608 may have an associated content addressable memory (CAM) 1610 and a RAM 1612 for storing forwarding parameters (RAM 1612 may accordingly also be referred to as a parameter RAM or PRAM). In one embodiment, for a packet received via an input port, the packet is provided to a packet processing entity 1608 of a linecard 1604 coupled to the input port. The packet processing entity receiving the packet is configured to determine an output port of network device 1600 to which the packet is to be forwarded based upon information extracted from the packet. The extracted information may include, for example, the header of the received packet. In one embodiment, a packet processing entity 1608 is configured to perform a lookup in its associated CAM 1610, using the extracted information. A matching CAM entry then provides a pointer to a location in the associated PRAM 1612 that stores information identifying how the packet is to be forwarded within network device 1600. Packet processing entity 1608 then facilitates forwarding of the packet from the input port to the determined output port.

Since processing performed by a packet processing entity 1608 needs to be performed at a high packet rate in a deterministic manner, packet processing entity 1608 is generally a dedicated hardware device configured to perform the processing. In one embodiment, packet processing entity 1608 is a programmable logic device such as a field programmable gate array (FPGA). Packet processing entity 1608 may also be an ASIC.

Management card 1606 is configured to perform management and control functions for network device 1600 and thus represents the management plane for network device 1600. In one embodiment, management card 1606 is communicatively coupled to linecards 1604 and includes software and hardware for controlling various operations performed by the linecards. In one embodiment, a single management card 1606 may be used for all the linecards 1604 in network device 1600. In alternative embodiments, more than one management card may be used, with each management card controlling one or more linecards.

A management card 1606 may comprise a processing entity 1614 (also referred to as a management processing entity) that is configured to perform functions performed by management card 1606 and associated memory 1616. As depicted in FIG. 16, the routing table 1618 and associated next-hop and RI information may be stored in memory 1616. The next-hop and RI information may be stored and used in an optimized manner as described above. Memory 1616 is also configured to store various programs/code/instructions 1622 and data constructs that are used for processing performed by processing entity 1614 of management card 1606. For example, programs/code/instructions, which when executed by processing entity 1614 cause the next-hop information to be stored in an optimized manner may be stored in memory 1616. In one embodiment, processing entity 1614 is a general purpose microprocessor such as a PowerPC, Intel, AMD, or ARM microprocessor, operating under the control of software 1622 stored in associated memory 1616. In yet other embodiments, virtual machines running on microprocessors may act as one or more execution environments running on the network device.

In one embodiment, the functions performed by management card processing entity 1614 include maintaining a routing table, creating associations between routes in the routing table and next-hop information, updating the routing table and associated next-hop information responsive to changes in the network environment, and other functions. In one embodiment, management processing entity 1614 is configured to program the packet processing entities and associated memories of linecards 1604 based upon the routing table and associated next-hop information. Programming the packet processing entities and their associated memories enables the packet processing entities to perform data packet forwarding in hardware. As part of programming a linecard packet processing entity and its associated memories, management processing entity 1614 is configured to download routes and associated next-hops information to the linecard and program the packet processing entity and associated memories. Updates to the next-hop information are also downloaded to the linecards to enable the packet processing entities on the linecards to forward packets using the updated information.

What is claimed is:

1. A non-transitory computer readable medium comprising instructions executable by a physical processor for performing operations comprising:
    storing configuration information for a data-plane of a network device as a hierarchy of information;
    storing, as part of the hierarchy of information, portions of a command sequence issued by a controller to the data-plane of the network device, wherein the controller is associated with a control-plane of the network device, and wherein the control-plane manages routing information for routing packets in a network; and
    transmitting, to an information cache of the data-plane of the network device, information for retrieving the configuration information, wherein the data-plane of the network device is configured based on the configuration information.

2. The non-transitory computer readable medium of claim 1, wherein the operations further comprise tracking the command sequence issued by the controller to the data-plane of the network device.

3. The non-transitory computer readable medium of claim 1, wherein the hierarchy of information further comprises information related to a plurality of nodes, and wherein each node of the plurality of nodes comprises information indicative of a command in the command sequence.

4. The non-transitory computer readable medium of claim 3, wherein a position of each node from the plurality of nodes within the hierarchy of information is further indicative of a position of a command within the command sequence.

5. The non-transitory computer readable medium of claim 3, wherein the plurality of nodes comprises a leaf node that stores configuration data associated with the data-plane.

6. The non-transitory computer readable medium of claim 1, wherein the hierarchy of information is stored as a graph data structure.

7. The non-transitory computer readable medium of claim 1, wherein the hierarchy of information is stored as a tree data structure.

8. The non-transitory computer readable medium of claim 1, wherein the data-plane of the network device is configured to forward network packets based on the configuration information.

9. The non-transitory computer readable medium of claim 1, wherein the configuration information is stored using a JavaScript Object Notation.

10. A device, comprising:
    a processing system including a processor; and
    a memory that stores executable instructions that, when executed by the processing system, facilitate performance of operations, the operations comprising:
        storing configuration information for a data-plane of a network device as a hierarchy of information;
        storing, as part of the hierarchy of information, portions of a command sequence issued to the data-plane of the network device by a controller associated with a control-plane, wherein the control-plane manages routing information for routing packets in a network; and
        transmitting, to an information cache of the data-plane of the network device, information for retrieving the configuration information, wherein the data-plane of the network device is configured based on the configuration information.

11. The device of claim 10, wherein the operations further comprise tracking the command sequence issued by the controller to the data-plane of the network device.

12. The device of claim 10, wherein the hierarchy of information further comprises information related to a plurality of nodes, and wherein each node of the plurality of nodes comprises information indicative of a command in the command sequence.

13. The device of claim 12, wherein a position of each node from the plurality of nodes within the hierarchy of information is further indicative of a position of a command within the command sequence.

14. The device of claim 12, wherein the plurality of nodes comprises a leaf node that stores configuration data associated with the data-plane.

15. The device of claim 10, wherein the hierarchy of information is stored as a graph data structure, a tree data structure, or a combination thereof.

16. The device of claim 10, wherein the data-plane of the network device is configured to forward network packets based on the configuration information.

17. A method, comprising:
    storing, by a processing system comprising a processor, configuration information for a data-plane of a network device as a hierarchy of information;
    storing, by the processing system, as part of the hierarchy of information, portions of a command sequence issued to the data-plane of the network device by a controller associated with a control-plane; and
    transmitting, by the processing system, to an information cache of the data-plane of the network device, information for retrieving the configuration information, wherein the data-plane of the network device is configured based on the configuration information.

18. The method of claim 17, wherein the control-plane manages routing information for routing packets in a network, wherein the hierarchy of information further comprises information related to a plurality of nodes, and wherein each node of the plurality of nodes comprises information indicative of a command in the command sequence.

19. The method of claim 18, wherein a position of each node from the plurality of nodes within the hierarchy of information is further indicative of a position of a command within the command sequence, and wherein the plurality of nodes comprises a leaf node that stores configuration data associated with the data-plane.

20. The method of claim 17, wherein the hierarchy of information is stored as a graph data structure, a tree data structure, or a combination thereof.

\* \* \* \* \*